(12) United States Patent
Plow et al.

(10) Patent No.: US 8,386,350 B2
(45) Date of Patent: Feb. 26, 2013

(54) SYSTEM AND METHOD FOR EXTRACTING VALUE FROM A PORTFOLIO OF ASSETS

(75) Inventors: Gregory M. Plow, Poulsbo, WA (US); Farrokh E. Pourmirzaie, San Jose, CA (US)

(73) Assignee: International Buisness Machines Corporation, Armonk, NY (US)

( * ) Notice: Subject to any disclaimer, the term of this patent is extended or adjusted under 35 U.S.C. 154(b) by 451 days.

(21) Appl. No.: 11/696,104

(22) Filed: Apr. 3, 2007

(65) Prior Publication Data

US 2007/0244837 A1 Oct. 18, 2007

Related U.S. Application Data

(60) Provisional application No. 60/788,723, filed on Apr. 4, 2006.

(51) Int. Cl.
*G06Q 40/00* (2012.01)
(52) U.S. Cl. .......................................... 705/35; 705/36 R
(58) Field of Classification Search ...................... 705/35
See application file for complete search history.

(56) References Cited

U.S. PATENT DOCUMENTS

| | | | |
|---|---|---|---|
| 6,253,193 B1 * | 6/2001 | Ginter et al. ...................... 705/57 |
| 6,556,992 B1 * | 4/2003 | Barney et al. .......................... 1/1 |
| 7,962,511 B2 * | 6/2011 | Barney ........................... 707/776 |
| 2002/0002524 A1 * | 1/2002 | Kossovsky et al. .............. 705/36 |
| 2002/0004775 A1 | 1/2002 | Kossovsky et al. |
| 2004/0064392 A1 * | 4/2004 | Barkman, Jr. ................... 705/36 |
| 2004/0220842 A1 * | 11/2004 | Barney ............................... 705/7 |
| 2005/0010515 A1 * | 1/2005 | Woltjen ........................... 705/36 |
| 2005/0149401 A1 | 7/2005 | Ratcliffe et al. |
| 2005/0222959 A1 | 10/2005 | Brager |
| 2006/0015378 A1 * | 1/2006 | Mirrashidi et al. ................ 705/7 |
| 2006/0293985 A1 * | 12/2006 | Lederman et al. .............. 705/35 |
| 2007/0073625 A1 * | 3/2007 | Shelton ........................... 705/59 |
| 2007/0150298 A1 * | 6/2007 | Barney ............................... 705/1 |
| 2009/0018970 A1 * | 1/2009 | Barkman, Jr. ............... 705/36 R |

* cited by examiner

*Primary Examiner* — Leland Marcus
(74) *Attorney, Agent, or Firm* — Sughrue Mion, PLLC

(57) ABSTRACT

A system and methods for extracting value from a portfolio of assets, for example a patent portfolio, are described. By granting floating privileges described herein, a portfolio owner can extend an opportunity for obtaining an interest in selected assets from the portfolio to a client who lacks the resources to accumulate and maintain such a portfolio, in return for an annuity stream to the portfolio owner. The floating privilege can take many forms, depending on the needs of the client and the nature of the assets in the portfolio. The privilege is executed for a set of assets selected by the client and approved by the portfolio owner in accordance with a floating privilege agreement controlling the floating privilege.

99 Claims, 9 Drawing Sheets

SYSTEM AND METHOD FOR EXTRACTING VALUE FROM A PORTFOLIO OF ASSETS

CROSS REFERENCE TO RELATED APPLICATIONS

This application claims the benefit of U.S. Provisional Application No. 60/788,723, filed Apr. 4, 2006, which is incorporated herein by reference.

FIELD OF THE INVENTION

The present invention relates to systems and methods for extracting value from a portfolio of assets.

BACKGROUND

A relatively small number of very large corporations have substantial asset portfolios, for example intellectual property portfolios. These corporations invest considerable amounts of money to acquire and maintain such large portfolios. In recent years, additional emphasis has been placed on leveraging these large intellectual property portfolios to achieve a greater return on the investment associated with their creation and maintenance.

Conventional techniques for extracting value from a large intellectual property portfolio include patent licensing, as well as the outright sale of a patent or set of patents. Patent licensing is frequently the result of business negotiations between a patent owner and an alleged infringer surrounding the infringing use of one or more patents. Licensing negotiations can be a slow and difficult process because of the adversarial nature of the negotiations, thereby gating the number of successful licensing negotiations in each year.

One method of establishing licensing agreements involves a search for infringers, and approaching infringers to negotiate a licensing agreement. Proof packs may be generated to demonstrate the infringement. Additionally, the patent holding party may approach the infringer with a set of patents including the infringed patents plus other patents relating to the infringer's field of endeavor, for example five patents, and offering a license agreement for the set of patents. Even if negotiations of this kind are successful, they can be long and drawn out. If the negotiation process takes four to five years, for example, the return on investment may be substantially diminished.

Several types of interests in intellectual property can be transferred between parties. Taking a patent as an example, the entire right, title and interest in the patent can be transferred between parties by assigning the rights in the patent. The party owning title in the patent has the right to enforce the patent and typically has standing to sue for patent infringement in the federal courts. Alternatively, the patent owner can retain title in the patent yet grant some of the rights in the patent to others by licensing those others. An exclusive license gives the licensee exclusive rights in the patent. Such exclusive rights can be limited to a geographic area or to a particular field of use. A party will take an exclusive license to a patent to be the only one in the geographic area or in the field of use, which are specified in the license, to use the patented technology. An exclusive license often has sufficient rights to enforce the patent. A non-exclusive license, on the other hand, gives the licensee only limited rights in the patent, generally, to use the patented technology along with other non-exclusive licensees. Unlike an exclusive licensee, a non-exclusive license does not have standing to enforce the patent.

A patent, or sets of related patents, may be sold to an interested party for a one time revenue gain, in which the patent owner assigns the patent to the interested party. Unlike the case where the patent owner retains title to the patent and grants licenses to others, an outright sale typically has the disadvantage of precluding further leveraging of the patent by licensing the patent. Assigning the rights in the patent typically also precludes further use by the patent owner for defensive purposes. Just because a set of patents is not in a company's business interest, does not mean that those patents will not prove valuable in a future litigation initiated against the company.

SUMMARY

Illustrative, non-limiting embodiments of the present invention overcome the above disadvantages and other disadvantages not described above. Also, the present invention is not required to overcome the disadvantages described above, and an illustrative, non-limiting embodiment of the present invention may not overcome any of the problems described above.

A new paradigm for exploiting the inherent value within a large asset portfolio, such as a portfolio of intellectual property asserts (e.g., patents, copyrights, trademarks and trade secrets) is described that goes beyond the normal licensing and sale activities known and practiced in the prior art. The general concept of extracting value from a portfolio of assets, for example patents, utilizing a floating privilege, for example a floating assignment privilege, is summarized by the following step:

granting to a client for consideration by an asset portfolio owner a floating privilege to a dynamic set of assets, such as a set of patents, wherein the floating privilege is a right to obtain an interest in one or more of the assets in the dynamic set upon the occurrence of a predetermined event.

Note that the right, or option, is not for any specific asset, since the set of assets is considered to be dynamic following the establishment of a floating privilege. The set or pool of assets is dynamic because no particular asset is guaranteed to exist at a later time. The right to obtain an interest in one or more of the assets is a privilege that is not tied to any particular asset in the pool of assets, but rather floats over the assets so that it can be applied to any of the assets in the pool. When the privilege is executed, an interest is obtained to one or more assets selected from the presently available assets within the dynamic set of assets at the time the privilege is executed. By agreement, while the set of assets covered by the floating privilege is dynamic, the number of assets in the set is typically constrained in some way to ensure continuing value to the client.

An example of such a predetermined event can be the initiation of a patent infringement lawsuit by a third party against the client. The client can then use the floating privilege to select one or more patents from among the set of assets associated with the privilege to assert against the third party. Executing the privilege can include granting sufficient rights in the selected patents to give the client standing to sue the third party for infringement of those patents. For example the client can be granted an exclusive license in the patents or the selected patents can be assigned to the client. A predetermined event, as used within the context of this specification for the purpose of executing a floating privilege, may be referred to herein as a "trigger event".

BRIEF DESCRIPTION OF THE DRAWINGS

The aspects of the present invention will become more apparent by describing in detail illustrative, non-limiting embodiments thereof with reference to the accompanying drawings, in which like reference numerals refer to like elements in the drawings.

DETAILED DESCRIPTION

The techniques disclosed herein are directed to a new system and method for extracting value from a portfolio of assets. The novel processes comprising this model will have greater appeal to prospective clients in the business world, as well as the potential to extract a greater return on investment from a large portfolio of assets. Examples of these assets include, but are not limited to, patents, copyrights, trademarks, trade secrets, real property, event tickets and travel tickets. To simplify the description hereinafter all types of assets are referred to herein as simply assets.

This new paradigm encompasses the creation of a dynamic pool of assets to which a "floating privilege" is offered in return for an annuity revenue stream, or other valuable consideration, to the asset pool owner. In accordance with the terms of a contract that runs with the floating privilege, upon the occurrence of a predetermined event (hereinafter, a "trigger event"), the privilege is activated. The rights associated with this floating privilege include the selection of a set of a predetermined number of assets and transfer of certain legal interests in those assets.

The pool of assets to which a "floating privilege" may be offered is dynamic in nature. That is, in accordance with the teachings presented infra, the set of specific assets in a pool may change over time following the creation of one or more floating privileges linked to the pool without violating the floating privilege agreement. Thus, a privilege, or right, to any specific asset is typically not guaranteed in a floating privilege agreement. Accordingly, the terms "asset pool", "pool", "pool of assets" and "dynamic asset pool" are hereinafter deemed equivalent in their intended meanings as used within the present application, and anticipate a dynamic nature with respect to the specific assets residing within the pool.

Asset Pool and Floating Privilege

Figure 1:
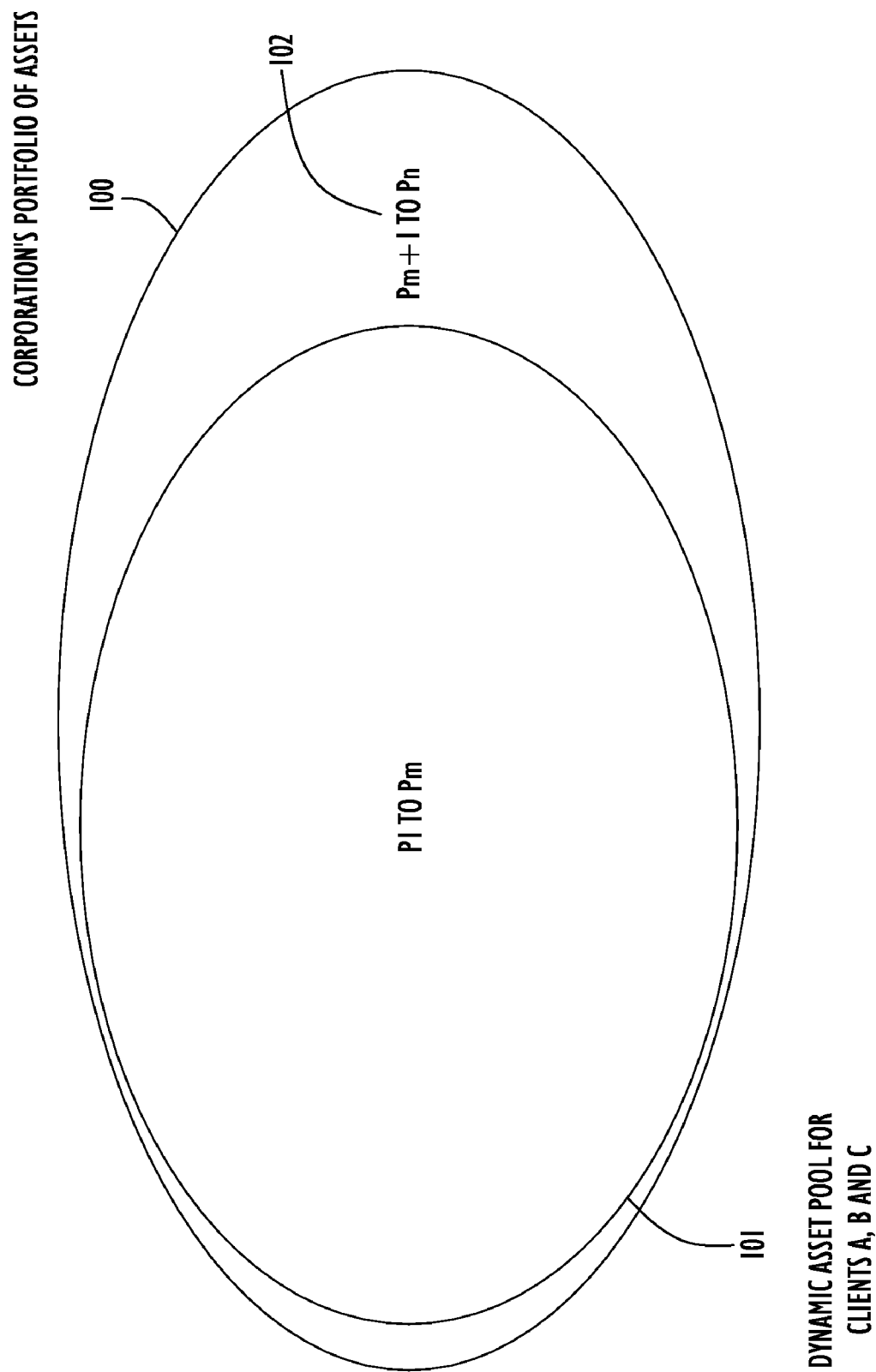
FIG. 1 is a conceptual diagram representing a portfolio owner's, such as a corporation's, portfolio of assets and those assets within the portfolio that have been designated as a dynamic asset pool for a plurality of clients having a floating privilege to obtain an interest in one or more of the assets in the pool.
Figure 2:
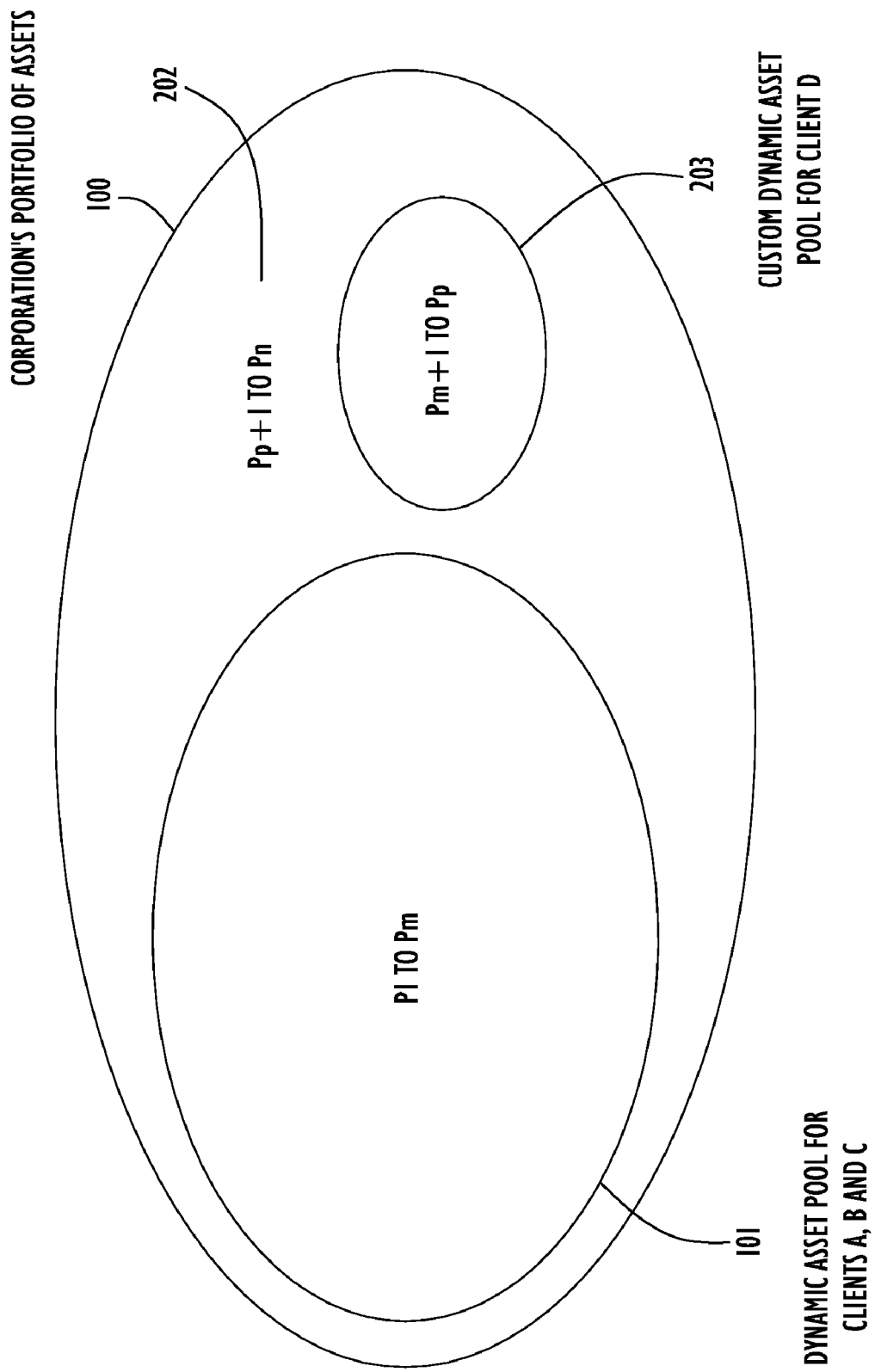
FIG. 2 is a conceptual diagram representing the corporation's portfolio of assets, a dynamic asset pool in which a plurality of clients have a floating privilege to obtain an interest in one or more of the assets in the first dynamic asset pool and a custom dynamic asset pool that includes assets for a single client with a floating privilege for the custom asset pool.
Figure 3:
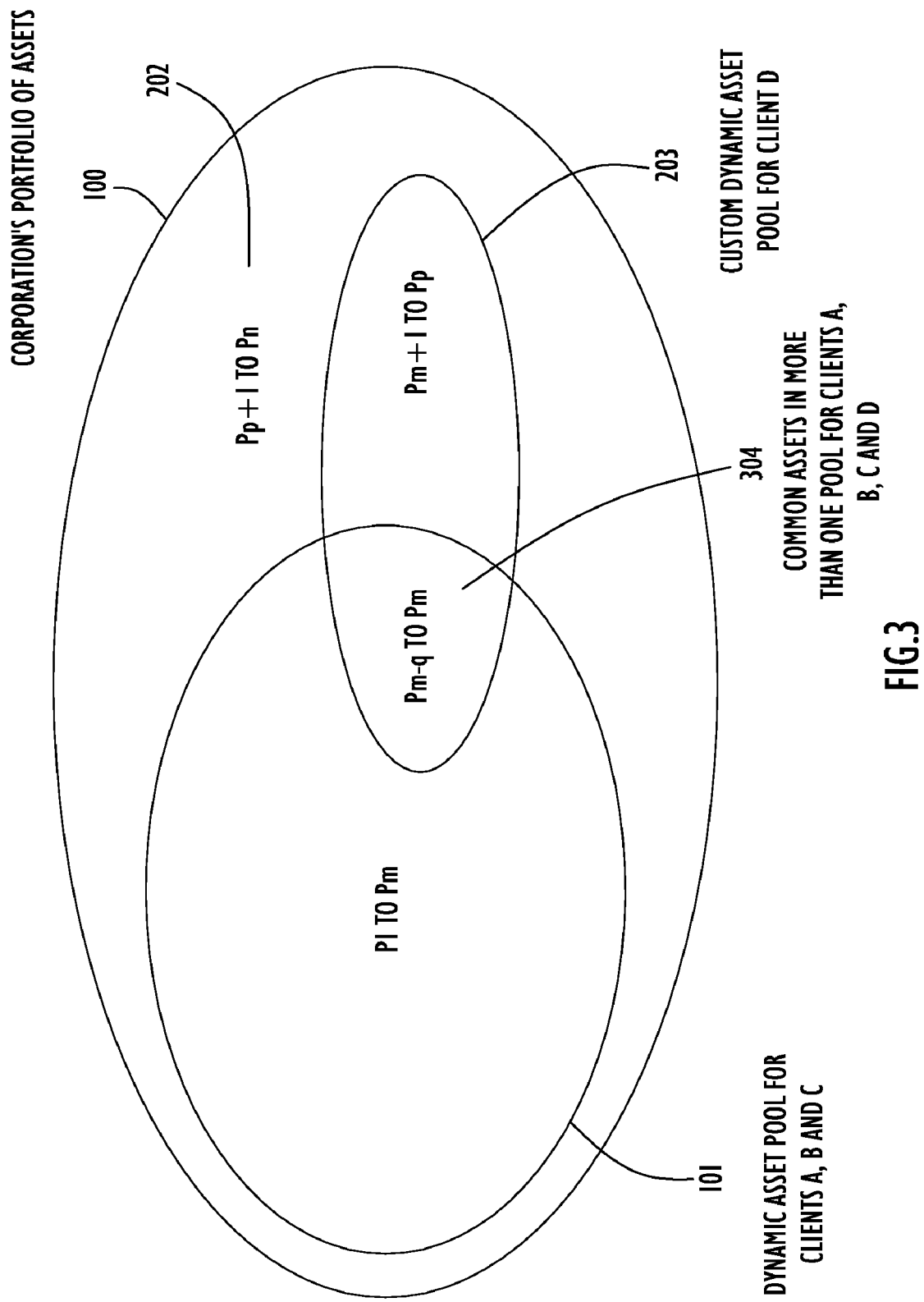
FIG. 3 is a conceptual diagram representing the corporation's portfolio of assets and a dynamic asset pool and a custom asset pool that both include some of the same assets.

The asset pool and floating privilege concepts are illustrated with several non-limiting embodiments shown in FIGS. 1 through 3.

FIG. 1 is a conceptual diagram showing an example of one embodiment of an entity's portfolio of assets 100 and how it is grouped into assets that can be subject to a floating privilege and those that the entity does not make available to others. The portfolio of assets 100 represents the total set of assets the entity owns that could be subject to transfer to another. In the example of FIG. 1, the entity, also referred to as the asset portfolio owner, or portfolio owner, is a corporation and assets are intellectual property assets and patents in particular. It will be understood that the assets are not limited to patent or intellectual property assets, but can be other types of assets in which rights can be transferred to others.

The portfolio owner might own hundreds or even thousands of patents (P). In this example, the corporation owns "n" patents, where n is a positive integer. The corporation, in this example, has designated "m" of its patents P1 to Pm as eligible for selection for transfer to the holders of a floating privilege upon the occurrence of a predetermined event, thereby forming a floating privilege pool 101, where m is a positive integer less than n. This floating privilege pool is also referred to as a dynamic asset pool, or more simply a "pool". In this example, three of the corporation's clients, A, B and C, each have purchased a floating privilege for the assets in the floating privilege pool 101. The corporation's remaining patents 102, Pm+1 to Pn, are not included in the floating privilege pool, but rather are held by the corporation for its own exclusive use. Although patents P1 to Pm are shown in the floating privilege pool in FIG. 1, the specific patents in the pool may change due to the dynamic nature of the pool.

FIG. 2 shows another embodiment of the portfolio owner's portfolio of assets 100 divided into a floating privilege pool 101 containing patents P1 to Pm and also containing a custom floating privilege pool 203. The custom floating privilege pool 203 contains patents Pm+1 to Pp, where p is a positive integer greater than m and less than n. In this embodiment client D has contracted with the corporation to have a floating privilege to the custom floating privilege pool 203. Custom pool 203 is a dynamic asset pool in that the patents within the pool can change over time. Alternatively, client D can agree with the corporation to limit the changes to the custom pool 203. For example, the contract between the corporation and client D can specify that the certain patents remain in the custom pool 203 while others may change.

FIG. 3 shows another embodiment of the portfolio owner's portfolio of assets 100 also divided into a floating privilege pool 101 containing patents P1 to Pm and containing a custom floating privilege pool 303. The remaining patents 202 in the portfolio consist of patents Pp+1 to Pn.

However, in the embodiment shown in FIG. 3, the custom floating privilege pool 303 contains patents that also are included in the floating privilege pool 101. Accordingly, the custom floating privilege pool 303 contains patents Pm−q to Pp, where q is a positive integer less than m and p is greater than m and less than n. Patents Pm−q to Pm (304) are common to both the floating privilege pool 101 and the custom floating privilege pool 303 since they are contained in both pools. Accordingly, clients A, B, C and D each have a floating privilege for the common assets 304 in the two pools.

FIGS. 1-3 are intentionally simple in their structure so as not to unnecessarily obfuscate the principles of the present invention and to further facilitate a complete understanding.

However, it is anticipated that real world applications of the present teachings would involve having multiple clients with floating privileges to any given dynamic asset pool created for that purpose. Indeed, the client list could be dozens, hundreds, or even a thousand or more.

Furthermore, it is anticipated in real world applications that the number of assets in a pool subject to a floating privilege, although variable as discussed in greater detail infra, at any given point in time would number, typically, into the hundreds or thousands.

By employing the techniques described here, a client corporation that lacks a large asset portfolio can have access to a large corporation's massive asset portfolio in a time of need. The client corporation's rights to these assets could be publicized so that anyone considering suing the client would have to consider all of the assets at the client's disposal. In this way, a floating privilege to a dynamic asset pool provides both a deterrent value and an enhanced ability for the client corporation to fend off such lawsuits.

FIGS. 4 through 7 are flowcharts showing non-limiting embodiments for creating a dynamic asset pool, creating a floating privilege, processing a dynamic asset pool event, and processing a floating privilege event. It will be understood that these flowcharts illustrate example processes and other processes can be used to practice the invention.

Creating a Dynamic Asset Pool

Figure 4:
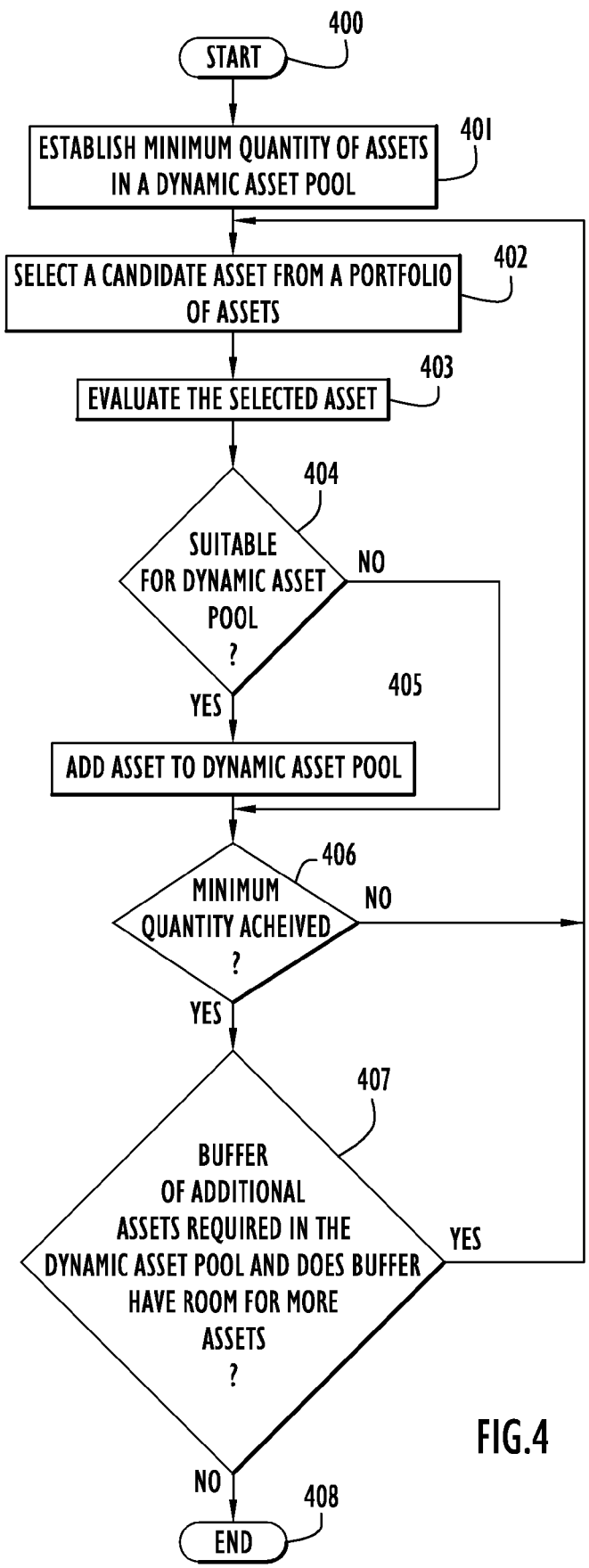
FIG. 4 is a flowchart illustrating a method for creating a dynamic asset pool.

FIG. 4 shows an example of a process for creating a dynamic asset pool. The process for creating a dynamic asset pool is started 400 and a minimum quantity of assets is established in a dynamic asset pool 401. In the example shown in FIG. 1, the portfolio owner, a corporation, establishes a minimum number of patents to populate the floating privilege pool 101. This minimum quantity of assets forms a basis for an agreement between the corporation and its clients as to the minimum size of the dynamic asset pool. Due to the dynamic nature of the asset pool, with the corporation adding and removing assets from the pool over time, the number of assets in the dynamic asset pool likely will vary. The corporation may specify in a contract with its clients that the dynamic asset pool will always have at least the minimum number of assets in the pool. For example, assuming that the corporation owns 10,000 patents, it may decide to offer clients a floating privilege to 80% of those patents or 8,000 patents. Accordingly, the company establishes the minimum quantity of patents for the dynamic asset pool at 8,000 patents. The minimum quantity of assets can be established in a variety of ways. For example, the company can designate a specific number of its patents to include the dynamic asset pool. Alternatively, the company can designate a percentage of its total patents to include in the dynamic asset pool. It will be understood that other ways of establishing the minimum quantity of assets in the dynamic asset pool can be employed in step 401.

Once the minimum quantity of assets is established, the dynamic asset pool is populated by evaluating the corporation's assets and selecting those assets that are suitable for inclusion in the dynamic asset pool. In step 402 a candidate asset is selected from the portfolio of assets to evaluate for inclusion in the dynamic asset pool.

In step 403 the selected asset is evaluated against certain criteria for determining whether the asset is suitable for inclusion in the dynamic asset pool. An example of criteria a selected asset can be evaluated against is a relevancy rating that can be specified for the asset. In step 404 it is determined whether the selected asset is suitable for inclusion in the dynamic asset pool based on the results of the evaluation. If the asset is determined to be suitable, it is added to the dynamic asset pool in step 405. The process then proceeds to step 406. If the asset is determined not to be suitable, the asset is not added to the dynamic asset pool and the process proceeds to step 406. For example, a strong patent relating to a core technology of a company's strategic product line may be deemed unsuitable for a high relevancy rating. Likewise, a patent claiming an invention not presently embodying a company's product line may represent an asset deemed suitable for inclusion having a very low relevancy rating.

In step 406 the process determines whether the dynamic asset pool contains at least the minimum quantity of assets established in step 401. The process compares the number of assets in the pool against the minimum quantity of assets established in step 401. If the number of assets in the pool is less than the established minimum number of assets, the process flow returns to step 402 in which another candidate asset is selected from the portfolio of assets for evaluation. Alternatively, if the asset pool does not include at least the established minimum number of assets, the process flow can return to step 401 in which the corporation can establish a new minimum number of assets for the dynamic asset pool.

If in step 406 it is determined that the number of assets in the pool is greater than or equal to the established minimum number of assets, the process proceeds to step 407. Step 407 is an optional step if the corporation wants to add a buffer of additional assets to the dynamic asset pool over the minimum quantity of assets established in step 401. By adding a buffer of additional assets to the dynamic asset pool, assets can be removed from the pool without the number of assets in the pool dropping below the minimum number of assets clients expect the pool to contain. If the corporation establishes a buffer for the dynamic asset pool, and the number of assets in the pool does not equal or exceed the buffer's capacity, the process flow returns to step 402 to select another candidate asset to add to the dynamic asset pool. If the dynamic asset pool either does not have a buffer established for the pool or if the number of assets in the pool equals or exceeds the size of the buffer, the dynamic asset pool creation process ends at step 408.

Creating a Floating Privilege

Figure 5:
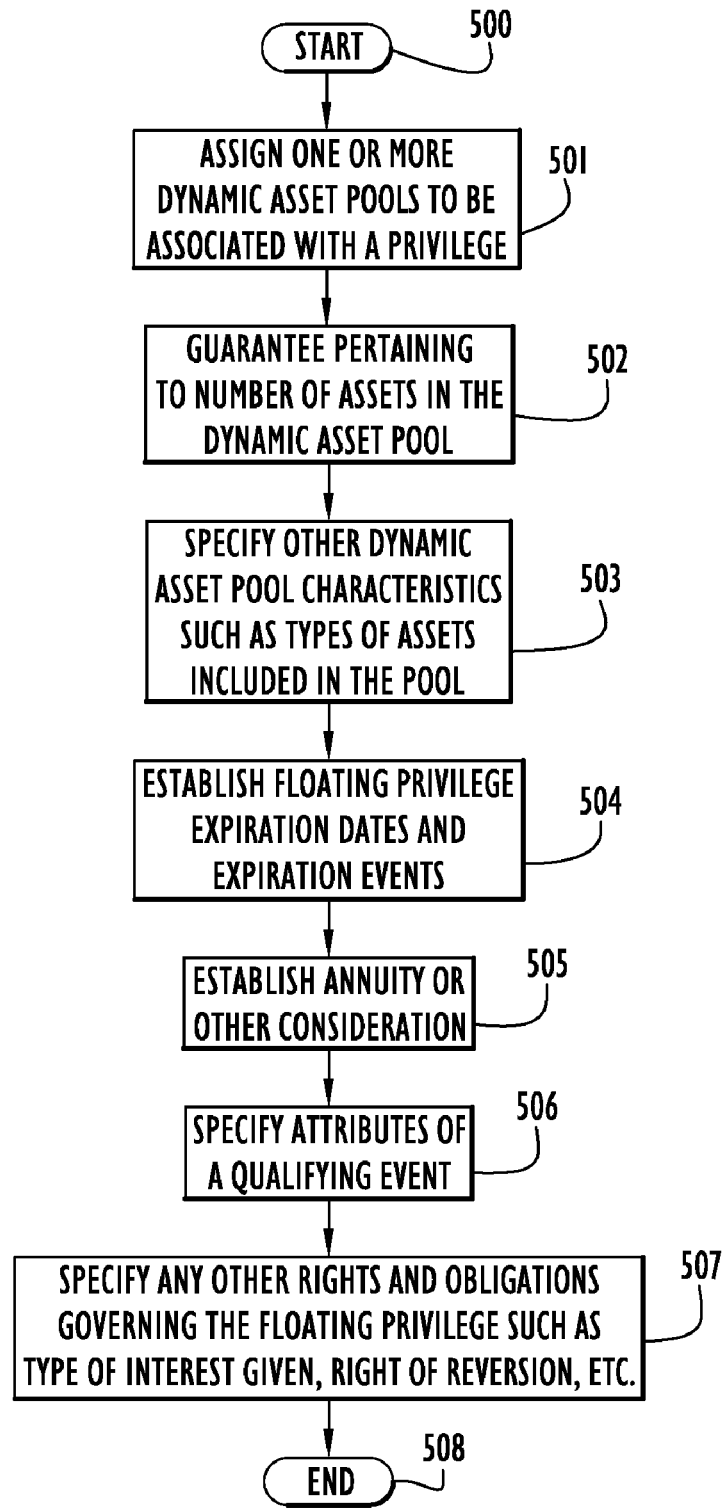
FIG. 5 is a flowchart illustrating a method for creating a floating privilege.

FIG. 5 is a flowchart illustrating a method of creating a floating privilege for use by a client to obtain an interest in one of more of the assets in one or more dynamic asset pools upon the occurrence of a predetermined triggering event. An example of such a triggering event is the client being sued for patent infringement. The process of creating a floating privilege starts at step 500. Once the process starts, the portfolio owner, in step 501, assigns one or more dynamic asset pools to be associated with a floating privilege. In one embodiment the privilege can be represented by a data structure recorded in a computer readable medium. In another embodiment, the floating privilege is recorded in a written document. In still another embodiment the floating privilege is represented both by a data structure recorded in a computer readable medium and is recorded in a written document. The process flow continues with step 502.

In step 502 the asset portfolio owner specifies a guarantee as to the number of assets that will be present in the dynamic asset pool at any time after the privilege is granted. This can be specified as a minimum number of assets that the portfolio owner guarantees will be present in the dynamic asset pool. In one embodiment this guaranteed number of assets is associated with the privilege by indicating the guaranteed number of assets in the privilege data structure. In another embodiment the guaranteed number of assets is specified in the written document in which the privilege is recorded. The process flow continues with step 503.

In step 503 the asset portfolio owner specifies other dynamic asset pool characteristics. One example of such characteristics is the types of assets included in the pool. In the embodiment shown in FIG. 1, for example, the type of asset may be a software patent or a hardware patent; or a patent within a particular technology area, such as speech recognition. The assets can be comprised of other types of intellectual property assets, such as copyrights and trade secrets. In one embodiment these other characteristics are associated with the privilege by indicating those characteristics in the privilege data structure. In another embodiment those characteristics are specified in the written document in which the privilege is recorded. The process flow continues with step 504.

In step 504 the asset portfolio owner specifies when the floating privilege expires. In one embodiment the asset portfolio owner establishes an expiration date that specifies when the floating privilege expires. In another embodiment the asset portfolio owner specifies an expiration event or series of events that cause the floating privilege to expire. In one embodiment these expiration dates and/or events are associated with the privilege by indicating those dates and/or events in the privilege data structure. In another embodiment those dates and/or events are specified in the written document in which the privilege is recorded. The process flow continues with step 505.

In step 505 the asset portfolio owner specifies the consideration a client provides in return for receiving the floating privilege. In one embodiment the asset portfolio owner specifies an annuity payment the client will provide in return for receiving the floating privilege. In one embodiment details about the consideration are associated with the privilege by recording the consideration details in the privilege data structure or providing a reference in the privilege data structure to a location in a computer readable storage medium where those consideration details are recorded. In another embodiment those consideration details are specified in the written document in which the privilege is recorded. The process flow continues with step 506.

In step 506 the asset portfolio owner specifies attributes of a qualifying event, or trigger event, in which the trigger event is an event that triggers activation of a client's floating privilege. By activating the client's floating privilege the client, according to an agreement with the portfolio owner, may select one or more of the assets in the dynamic asset pool for transfer to the client for the client's use. One example of a trigger event is a litigation event concerning the client. For example, the portfolio owner can specify that the filing of a complaint alleging that the client infringes another's patent is a trigger event. Another example of a trigger event is a request by the client to obtain an interest in an asset in the dynamic pool of assets. In one embodiment details about the trigger event are associated with the privilege by recording details about the trigger event in the privilege data structure or providing a reference in the privilege data structure to a location in a computer readable storage medium where those trigger event details are recorded. In another embodiment the trigger event details are specified in the written document in which the privilege is recorded. The process flow continues with step 507.

In step 507 the asset portfolio owner specifies any other rights and obligations governing the floating privilege. For example, such other rights and obligations can include the type of interest a client will be given in an asset upon the occurrence of a trigger event. For example, the asset portfolio owner can specify that the rights in the asset will be assigned to the client upon the occurrence of a trigger event. Alternatively, the asset portfolio owner can specify that the client will receive an exclusive license for the asset in response to the occurrence of a trigger event. Yet another right that can be specified is a right of reversion for an asset in which the rights granted to the client revert back to the asset portfolio owner in response to satisfaction of a condition. The asset portfolio owner also can specify various obligations associated with the privilege. In certain embodiments the asset portfolio owner specifies these other rights and obligations on an asset by asset basis. In one embodiment details about these other rights and obligations are associated with the privilege by recording details about those rights and obligations in the privilege data structure or providing a reference in the privilege data structure to a location in a computer readable storage medium where those details are recorded. In another embodiment those details concerning the other rights and obligations are specified in the written document in which the privilege is recorded. The process flow then ends with step 508.

Processing a Dynamic Asset Pool Event

Figure 6:
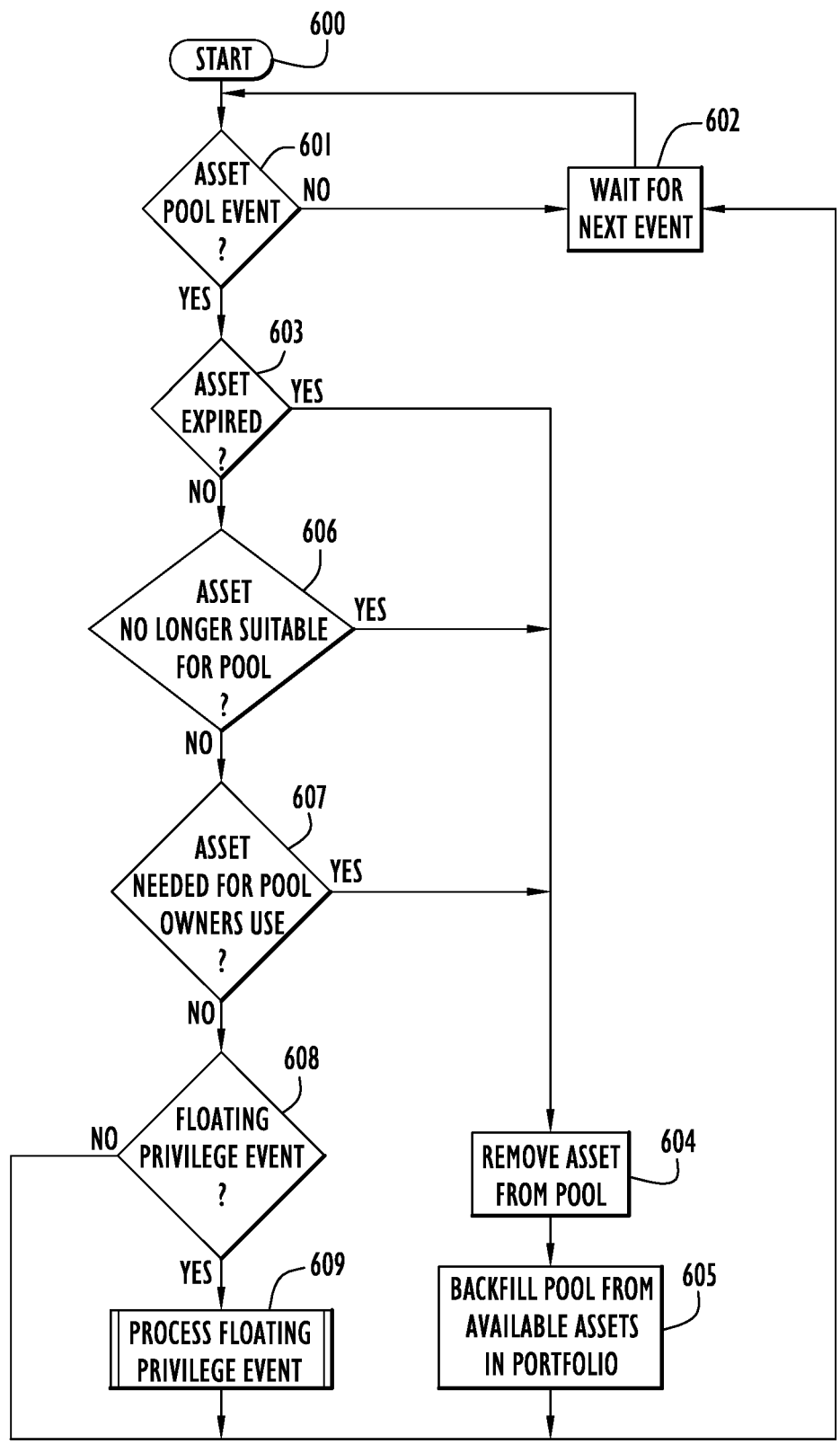
FIG. 6 is a flowchart illustrating a method for processing a dynamic asset pool event.

FIG. 6 is a flowchart illustrating a method for processing a dynamic asset pool event. A dynamic assert pool event is either an event concerning maintaining or changing the asserts within a dynamic asset pool, as discussed above, or a floating privilege event, such as an event that triggers activation of a floating privilege for the pool As discussed above, an example of such a triggering event is the client being sued for patent infringement. Processing of a floating privilege event is described in greater detail below. Processing a dynamic asset event starts at step 600. Once the process starts, it is determined in step 601 whether an asset pool event occurs. Such asset pool events are concerned with maintaining the dynamic asset pool. Examples of asset pool events include removing an asset if the asset has expired, if the asset is deemed to no longer be suitable for inclusion in the dynamic asset pool, and if the portfolio owner needs the asset for the owner's exclusive use. If an event is determined not to be an asset pool event in step 601 the process flows to step 602 where the process waits for the occurrence of a next event. Upon the occurrence of the next event the process returns to step 601 to determine if the event is a dynamic asset pool event. If the event determined in step 601 to be an asset pool event, the process flow continues to step 603.

In step 603 it is determined whether the asset to which the asset pool event relates has expired. This step can be performed by examining expiration information, such as an expiration date and/or time, associated with the asset. If the asset has expired, the process flows to step 604 where the asset is removed from the dynamic asset pool. Next, in step 605, the pool is backfilled from available assets in the portfolio of assets by inserting an asset from the portfolio into the dynamic pool of assets to replace the removed asset. The process then flows back to step 602 to wait for the next event.

If in step 603 it is determined that the asset has not expired, the process flows to step 606 where it is determined whether the asset is no longer suitable for inclusion in the dynamic asset pool. For example, due to an acquisition or merger a previously non-strategic asset may become strategic. If the asset is determined to no longer be suitable for the pool, the asset is removed from the pool in step 604. If, however, the asset is determined still to be suitable for inclusion in the pool, the process flow continues to step 607.

If in step 607 it is determined that the portfolio owner needs to use the asset, then the process flows to step 604 where the asset is removed from the pool. If, however, it is determined that the portfolio owner does not need to use the asset, the process flow continues to step 608.

In step 608 it is determined whether the event is a floating privilege event, such as an event that triggers activation of a client's floating privilege. If the event is not a floating privilege event the process flows back to step 602 to wait for the next event to occur. If, however, the event is determined to be a floating privilege event, process flows to step 609 which is described in more detail in FIG. 7.

Floating Privilege Event

Figure 7:
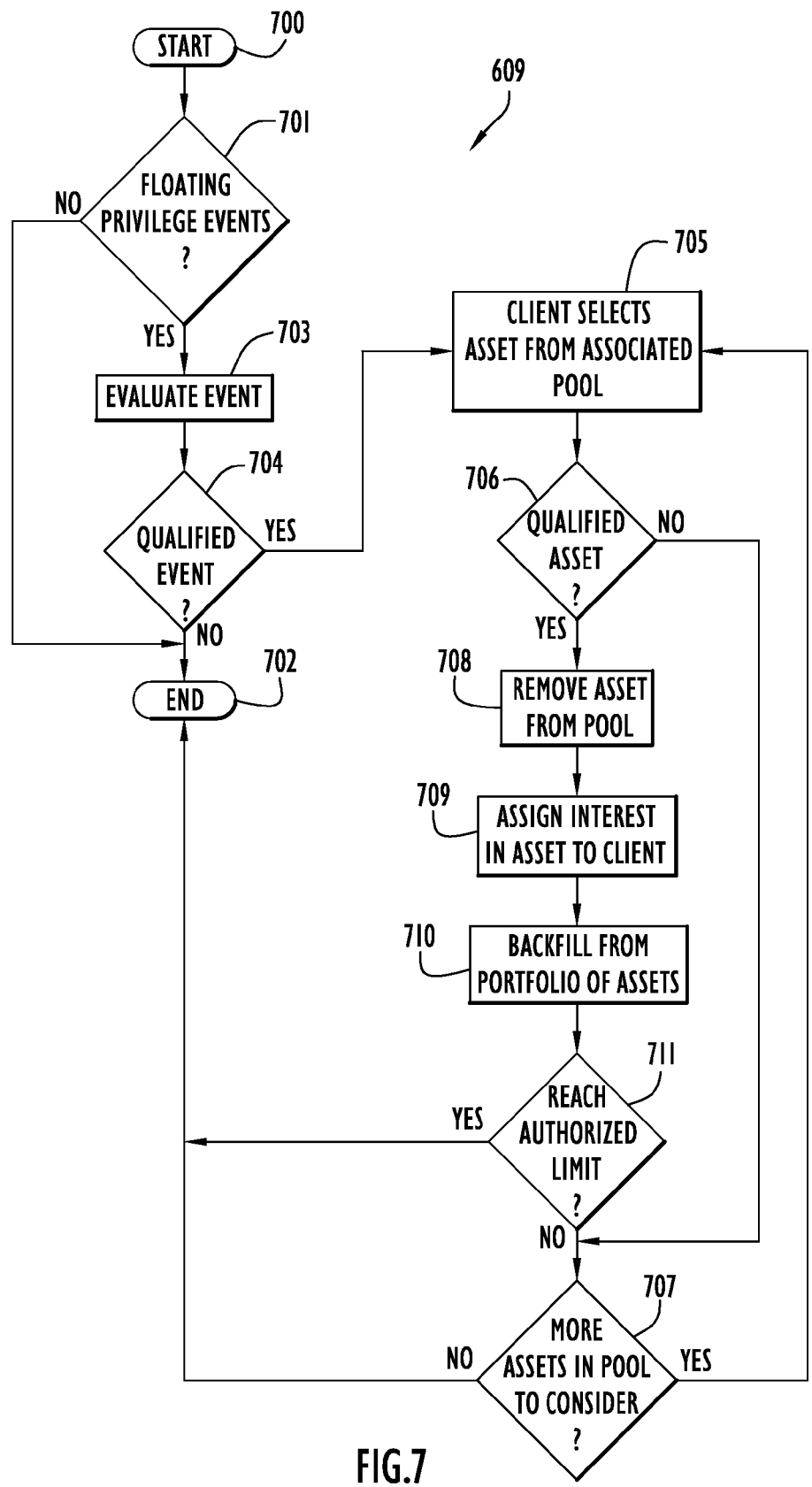
FIG. 7 is a flowchart illustrating a method for processing a floating privilege event.

FIG. 7 is a flowchart illustrating a method for processing a floating privilege event and shows step 609 of FIG. 6 in detail. The process starts at step 700 which continues the flow from step 608 in FIG. 6 upon determining that an event is a floating privilege event. In step 701 the process can check again to confirm that the event is a floating privilege event. If in step 701 it is determined that the event is not a floating privilege event, the process flows to step 702 which ends the floating privilege event processing. If, however, it is determined in step 701 that the event is a floating privilege event, then the process flows to step 703.

In step 703 the event is evaluated. In step 704, based on the evaluation of the event, it is determined whether the event qualifies for activating a client's floating privilege for a pool of assets. To determine whether an event qualifies as an event that triggers a client's floating privilege, information associated with the client's floating privilege, such as the attributes of a trigger event that are associated with the floating privileged can be inspected and compared with attributes of the floating privilege event under consideration. If attributes of the floating privilege event match the attributes of a trigger event associated with the client's floating privilege, then the floating privilege event is deemed to be a trigger event. The process then flows to step 705. If, however, the attributes of the floating privilege event do not match the attributes of a trigger event associated with the client's floating privilege, then the floating privilege event is deemed to be a non-qualifying event. In this case the process flows to step 702 where the floating privilege event processing ends.

In step 705 since the floating privilege event is determined to be a trigger event, the client's floating privilege is activated. Accordingly, the client may select one or more assets from the dynamic asset pool to which the floating privilege applies. Upon the client selecting an asset from the dynamic asset pool, step 706 determines if the selected asset is a qualified asset. A qualified asset is an asset in a dynamic asset pool that is deemed appropriate to transfer to a client in response to the occurrence of the specific trigger event. Typically the portfolio owner will verify that the asset the client selects from the pool is appropriate for a given qualifying or triggering event. For example, if the triggering event is a third party filing a patent infringement lawsuit against the client, an appropriate asset to select from the pool could be a patent that could be asserted against the third party in a counterclaim. Step 706 provides a check on the client to ensure that the client obtains from the pool only assets that are appropriate to the triggering event.

If the selected asset is deemed to be a non-qualifying asset, based on the trigger event, the process flows to step 707 in which it is determined whether the pool contains additional assets for the client to consider selecting. If there the pool contains such additional assets the process flows back to step 705 where the client selects another asset from the pool. If, however, there are no more assets in the pool from which the client may select, the process flows to step 702 where the floating privilege event processing ends.

If, however the selected asset is deemed to be a qualified asset, based on the trigger event, the process flows to step 708. In step 708 the qualified asset is removed from the pool. In step 709 the qualified asset which has been removed from the dynamic asset pool is transferred to the client. Specifically, the rights in the qualified asset to be transferred to the client are determined based on the types of interests to be transferred specified for the floating privilege. For example, if the floating privilege specifies that an assignment of rights in a qualifying assert is to be given to the client, then in step 709 the rights in the asset are assigned to the client. Further, if the floating privilege indicates other conditions or limitations on the transfer, those conditions and limitations are imposed on the transfer in step 709. For example, if the floating privilege indicates that any transfer of the asset will include a conditional right of reversion, such a conditional right of reversion will be included in the conditions of the transfer of the asset. Once the transfer of rights in the asset is completed in step 709, the process flows to step 710.

In step 710 the dynamic asset pool is backfilled to replace the removed quailed asset with another asset from the portfolio of assets. If after removing the qualified asset from the dynamic asset pool, the pool contains more than the minimum number of assets, the backfilling step may not be performed. Following the backfilling step, the process flows to step 711.

Step 711 determines whether the client has reached an authorized limit of assets to be transferred to the client from the dynamic asset pool. The client's floating privilege may contain information specifying an authorized maximum number of assets which the client may remove from the pool in response to the occurrence of a trigger event. If the client has not yet reached the authorized maximum limit of assets to remove, the process flows to step 707 which determines whether there are any more assets in the pool for the client to consider selecting. If the client has reached the authorized maximum limit of assets to remove, based on a limit specified in the client's floating privilege, the process flows to step 702 where the floating privilege event processing ends.

In one embodiment, one or more of the steps of the methods described above and depicted in FIGS. 4 through 7 is performed automatically by a computer programmed with and executing program instructions contained within the computer software. The computer software is recorded on a computer readable medium such as a magnetic memory, an optical disc, a semiconductor memory, or any other well known computer readable storage medium.

In another embodiment, the methods described above and depicted in FIG. 4 through FIG. 7 is a programmed method. The term programmed method, as used herein, is defined to mean one or more process steps that are presently performed; or, one or more process steps that are enabled to be performed in the future. Therefore, a programmed method may comprise presently performed process steps. A programmed method may also comprise process steps that are enabled to be performed by computer instructions incorporated into a computer-useable medium, the instructions capable of performing the process steps when executing on a computer. Further, a programmed method may also comprise process steps enabled to be performed by a computer system programmed by software, hardware, firmware or any combination thereof to perform the process steps. Further still, a programmed method may comprise process steps enabled to be performed by computer instructions transmitted over a propagation medium, the instructions capable of performing the process steps when executing on a computer.

In yet another embodiment the methods described above and depicted in FIG. 4 through FIG. 7 and not performed automatically, but rather are performed manually.

The pool of assets to which the floating privilege is granted is not static. There are many reasons why an asset may be added to, or removed from, a pool following the establishment of one or more floating privileges associated with the pool. One reason is that an asset may expire. For example, a patent asset has a calendar expiration date that will force its expiration independently of how many floating agreements may be in effect for the one or more pools associated with the asset. When the expiration date for an asset arrives, the asset no longer has value and therefore is either explicitly or implicitly removed from the pool. Another reason for removing an asset from a pool is that the owning entity of the pool of assets may find it beneficial to use the asset for its own use. In a dynamic business environment an event, such as a litigation event involving the owning entity, may make use of a particular asset within a pool highly desirable and, accordingly, the owners use of the asset may take priority, wherein it is removed from the pool reflecting the owner's exclusive use. Of course, the asset may be returned to one or more pools when it is determined that the owner's use of the asset is no longer required.

Additionally, in accordance with the potentially numerous floating privilege agreements in effect, qualified assets may be removed from a pool of assets as trigger events trigger the privilege exercise for one or more clients. These examples, and numerous other scenarios, make it advantageous to facilitate asset turnover within a pool without disrupting existing floating privileges to the pool, and without having a detrimental effect on the further creation of additional floating agreements to the pool.

Even though assets within a pool are potentially changing, the existing floating privileges in place remain attractive, and the ability to attract new clients to consider a floating privilege to the pool is retained. This is because a client finds a floating privilege highly desirable in that it is the shear size and function represented within the pool that enhance the odds of finding value in a time of need. Prior to the occurrence of a trigger event, it may be impossible to know what specific assets in a pool will be helpful in resolving the issues surrounding the event advantageously. Therefore, knowing that specific assets are available is not as beneficial as knowing that certain quantities of certain types of assets are available from which to choose to enhance the probability that something of value can be found following a trigger event. Typically, it is only following a trigger event that enough information is available to facilitate the recognition of what assets will be valuable to resolve the particular issue that motivated the trigger event. Large pools will provide confidence and comfort to a client that helpful assets will likely be found in a time of need.

While the number of assets removed from a pool due to interest transfer to clients is anticipated to be low, the floating privilege agreement must accommodate the dynamic nature of the pool contents. In one embodiment, the content of the pool is variable, while the size of the pool in number of assets is constant. In another embodiment, the size of the pool in number of assets is equal to or larger than a minimum guaranteed size. In yet another embodiment the size of the pool in number of assets can change according to a variable, for example, a size that cannot decrease by more than a certain percentage (e.g., 10%, etc.)

Floating Privilege System

Figure 8:
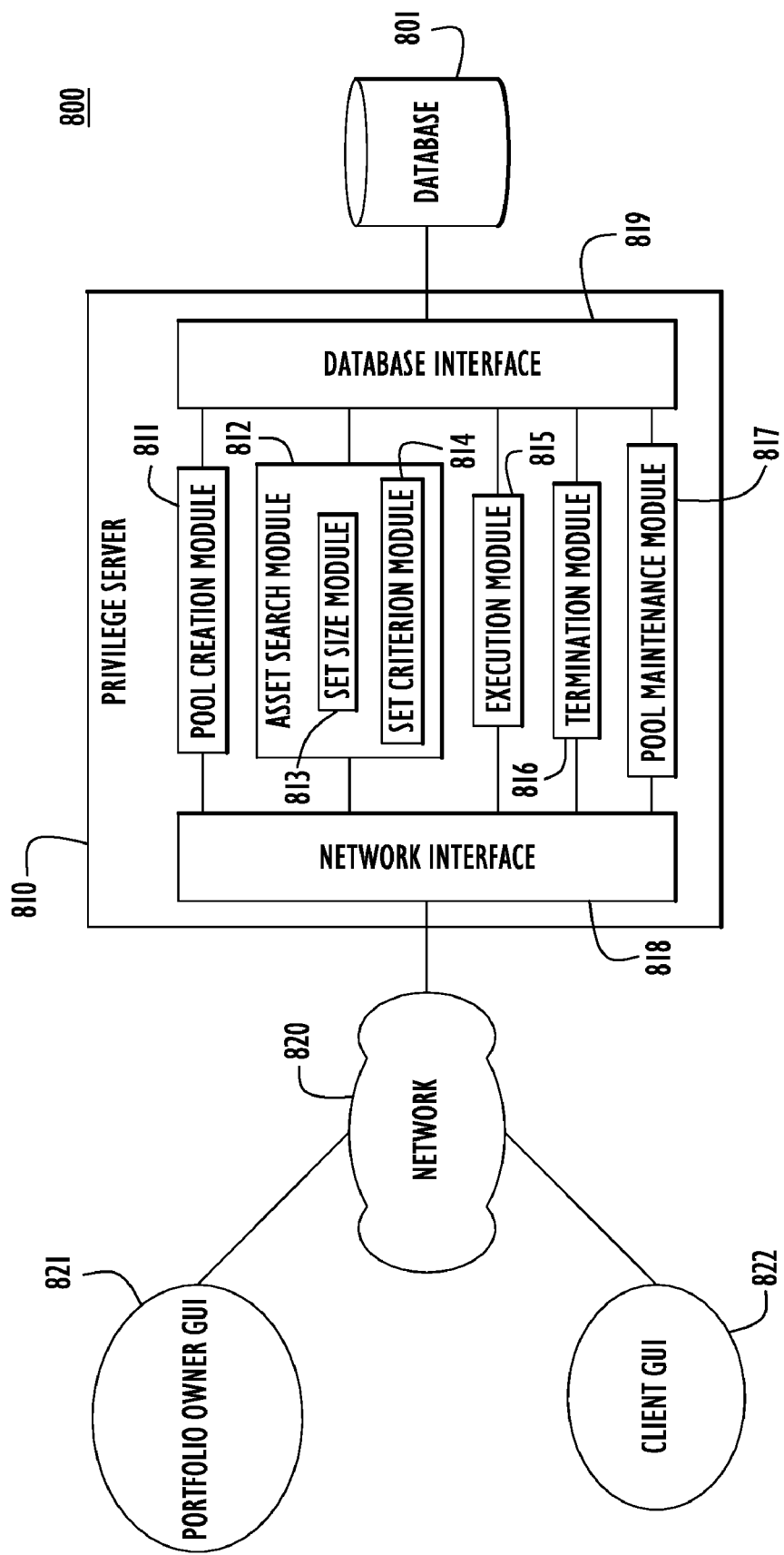
FIG. 8 is block diagram showing a system for creating and maintaining a dynamic portfolio of assets, and processing a floating privilege event.

Many of the processes described above may be implemented by a computer system, such as the system 800 depicted in the block diagram of FIG. 8. In one embodiment, a first user-friendly graphical user interface 821 (GUI) facilitates access for the portfolio owner over a network 820, such as the Internet, to a server 810, such as a secure web portal server, where various transactions and operations related to a floating privilege may be performed. The server 810 either contains or is coupled to a searchable database 801. In one embodiment, server 810 functions as a privilege server.

The privilege server 810, in one embodiment, includes a pool creation module 811, an assert search module 812 that includes a set size module 813 and a set criterion module 814. The privilege service also includes an execution module 815, a termination module 816 and a pool maintenance module 817. The modules within the privilege server 810 communicate with network 820 by way of a network interface 818 and with the database 801 by way of a database interface 819.

The database 801 contains indexed information describing the portfolio of assets. For example, the assets can be indexed within the database 801 according to a variety of aspects. In one embodiment, an asset table is used reflecting a portfolio of assets, as shown below in exemplary Table 1. Each row in the asset table corresponds to an asset from a portfolio of assets. Each asset is assigned an asset identifier, e.g. "Asset_1," "Asset_2," etc. The state of at least one dynamic factor is indicated, and whether or not each asset has been incorporated into one or more pools of assets offered to clients for the floating privilege. In one embodiment, pool creation is automatic and is determined by an evaluation of the information contained in Table 1, such as the state of the dynamic factor and/or other attribute or informational fields. As illustrated in Table 1, each asset having a dynamic factor in the first state (State_1) is eligible for selection into one or more pools, and each asset having the dynamic factor in the second state (State_2) is not eligible for selection into any pools. Therefore, in one embodiment, a pool is automatically created by scanning each row of Table 1 and, for entries in the first state, a further determination of suitability is made based on other attributes and information in the row, such as a technology name associated with an asset (e.g. search engines, semiconductors, network performance, etc). After a first pool is automatically created, additional pools also may be automatically created utilizing different criteria to be applied to rows in Table 1 having the first state. In another embodiment, a pool identifier is assigned to each asset comprising the set of assets for a given pool (not shown in Table 1 which, for simplicity, is assuming the creation of only a single pool).

TABLE 1

| Asset Identifier | Dynamic Factor | Included in an Asset Pool? | Asset Attribute | Interest in Asset Given to Client? |
| --- | --- | --- | --- | --- |
| Asset_1 | State_1 | Yes | Trait_1 | Yes |
| Asset_2 | State_2 | No | Trait_1 | n/a |
| Asset_3 | State_2 | No | Trait_2 | n/a |
| Asset_4 | State_1 | Yes | Trait_1 | Yes |
| Asset_5 | State_2 | No | Trait_2 | n/a |
| Asset_6 | State_1 | Yes | Trait_1 | Yes |
| Asset_7 | State_1 | Yes | Trait_2 | n/a |
| Asset_8 | State_1 | Yes | Trait_2 | n/a |
| Asset_9 | State_2 | No | Trait_1 | n/a |
| Asset_10 | State_2 | No | Trait_2 | n/a |

Each asset, as indicated supra, may be described by one or more attributes, e.g. "Trait_1" and "Trait_2." In one embodiment, clients can search the database, upon the occurrence of a trigger event, for assets having attributes deemed desirable by the client and belonging to a pool in which they possess a floating privilege. As indicated in Table 1, if an asset is not a part of a pool to which the client possesses a floating privilege, it is not relevant whether or not the asset possesses the selection criteria desired by the client. However, should the dynamic factor of an asset, e.g. Asset_2, change such that the asset is added to a pool for which the client has a floating privilege, the test of whether or not the asset meets the selection criteria desired by the client can be applied.

In one embodiment, once various assets are chosen for an initial interest set, further detailed analysis is typically performed by the client to ascertain with specificity whether or not a particular asset will meet their needs. Thus, the initial interest list of assets is further pruned until the number of assets on the list is equal to or less than the number of assets the client is entitled to receive an interest in accordance with the terms of the client's floating privilege agreement. Then, a final selection of assets can be submitted to the asset owner for verification and processing. At the conclusion of all selection and verification processing a final set, hereinafter referred to as a "qualified" set, of assets is identified for which an interest is given to the client from the asset owner. In one embodiment, the verification process is deployed by the owner to ensure that the requested assets are indeed useful in addressing the issues associated with the trigger event, in accordance with the terms of the client's floating privilege agreement with the owning party.

The database 801, in one embodiment, also stores an indicator for whether or not a privilege has been granted for each asset, the type of floating privilege granted, and the client receiving the privilege. Typically, once an interest to an asset is given to a client under the provisions of their floating agreement, that asset is removed from all pools, reflecting its unavailability for further use by other clients. Other information about an asset can be recorded in the asset table. Also, the asset table can be embodied in a single table, a plurality of related tables or even constructs other than tables.

Referring to the system 800 of FIG. 8, the privilege server 810 may represent a central focal point where all floating privilege transactions may be accommodated. For example, one useful service offered by the privilege server 810 would be facilitating access to the database 801 for the portfolio owner and one or more clients.

In one embodiment, the server 810 includes the pool creation module 811. The first GUI 821 enables the portfolio owner to use the pool creation module 811 to establish pools (e.g. 101 and 203 in FIG. 2) of assets eligible for the floating privilege. For example, the portfolio owner could use the first GUI 821 to enter pool selection criteria. In one embodiment, the first GUI 821 accesses the server 810 via network 820, such as the Internet.

A second user-friendly GUI 822 provides the client access, by way of network 820, to assets in the database 801, for example, the pool 101 of assets. A client may use GUI 822 to discover potentially useful assets available to receive an interest under the terms of their floating privilege. In one embodiment, the server 810 includes an asset search module 812 accessible by the client through the second GUI 822 for searching a set of assets from the one or more pools of assets to which the client has a floating privilege. For example, a third party may notify a client of the client's alleged infringement of a patent the third party owns. The client may perform research about the third party to discover the various products offered by the third party and the associated technology areas in which these products operate. Based upon this knowledge, the client could use the second GUI 822 to enter relevant selection criteria to view assets of potential value in addressing the infringement issue. In one embodiment, the second GUI 822 accesses the server 810 via the Internet 820. Assets and information about the assets, such as information held in the asset table, for example, can be displayed by way of the GUI 821 or 822.

The server 810 also includes the execution module 815 for facilitating execution of the privilege upon the occurrence of a trigger event in accordance with the terms of their floating privilege agreement. Typically, such execution assigns an interest to the client for at least one of the assets within the one or more pools for which the client possesses a floating privilege. Typically, the client chooses (with the assistance of knowledge gained from system 800) specific assets (but not more than the limit governed in the client's floating privilege agreement) to which to obtain an interest in those assets under the terms and conditions of the governing floating privilege agreement. In one embodiment, under the terms and conditions of the governing floating privilege, the pool owner has an opportunity to verify that the requested assets are appropriate in view of the trigger event. The pool owner can use the execution module 815 to verify or qualify that the selected assets are appropriate for the client to acquire based on the trigger event. Ultimately, an agreed upon qualified set of client selected assets (or asset) are specified for processing by execution module 815. As discussed supra, in one embodiment when an interest is given to a client the transaction is recorded in the database 801 with an indicator reflecting interest change for each asset processed by the execution module 815. In one embodiment of the present invention, the server 810 also includes the termination module 816 for terminating the floating privilege to one or more pools upon an occurrence of a predetermined termination event (hereinafter, simply a "termination event").

Figure 9:
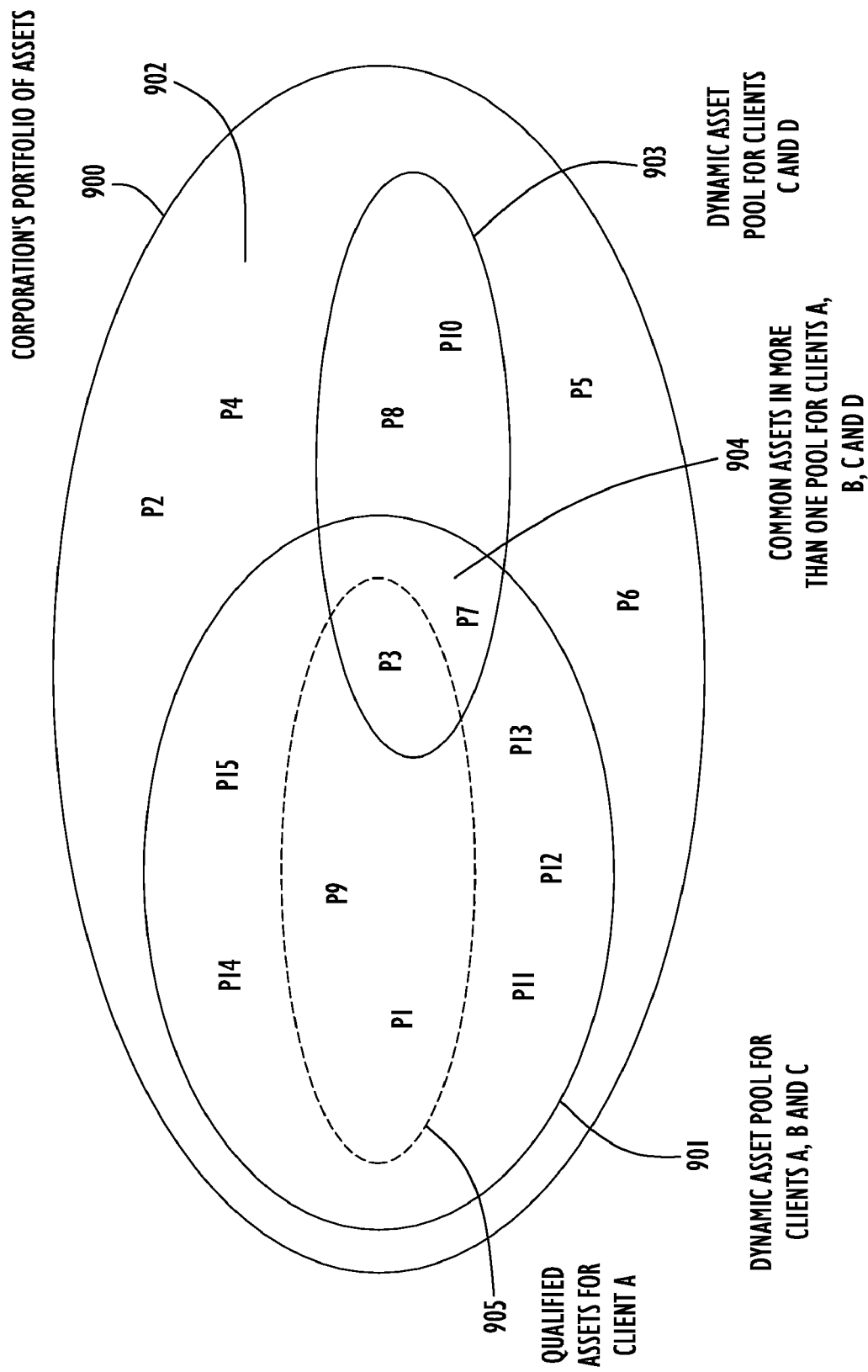
FIG. 9 is a conceptual diagram representing the corporation's portfolio of assets and a plurality of dynamic asset pools in which the assets are patents.

FIG. 9 is a conceptual diagram that is referenced in the following descriptions to facilitate understanding of the various embodiments described below. FIG. 9 shows a portfolio of assets 900, in this case patents P1 to P15, owned by the portfolio owner, a corporation, in which some of the assets are allocated to two overlapping dynamic pools. A first dynamic pool of assets 901 contains numerous patents, represented by patents P1, P3, P7, P9 and P11 through P15. Three clients, A, B and C, each have a floating privilege for this first pool. A second dynamic pool of assets 903 includes patents P3, P7, P8 and P10, and two clients C and D have a floating privilege to the assets in this second pool. Note that client C has two floating privileges, one to the first pool and one to the second pool. The two pools overlap in that they both contain two of the same patents: P3 and P7. These assets common to both pools 904 are eligible for selection by any of clients A, B, C and D if the appropriate trigger events occur. The portfolio also contains assets that are part of neither pool 902, namely patents P2, P4, P5 and P6. FIG. 9 also shows three qualified assets 905 for client A, namely, patents P1, P3 and P9. This figure.

In one embodiment, the server 810 includes the pool maintenance module 817 for removing assets from one or more pools as they become ineligible for the floating privilege for any of a variety of reasons, and adding assets to one or more pools for the purpose of backfilling for assets removed in accordance with any minimum asset requirements governed by the floating agreement. In one embodiment, multiple clients may have access to a given pool or given multiple pools, or there may be overlap between pools (904), as in FIG. 9. When a floating privilege is exercised for one or more assets (e.g. qualified assets 905, namely, patents P1, P3 and 9) for a client under the terms and conditions of a governing floating privilege agreement, the pool maintenance module 817 could carry out removing the one or more assets from any affected pools (a single pool or overlapping multiple pools where the asset to be removed is common across the multiple pools). Maintenance module 817 may also backfill by adding additional assets to the pool or pools affected by the floating privilege exercise in accordance with any minimum pool size requirements specified in the governing floating privileges associated with the affected pool or pools.

For example, referring to FIG. 9, once the privilege is executed by Client A for the selected and qualified set of assets 905 (i.e., patents P1, P3 and P9), the pool maintenance module 817 automatically removes assets 905 (i.e., patents P1, P3 and P9) from all affected pools, which for FIG. 9 is the first pool 901 and the second pool 903. In one embodiment, discussed supra, the removal of an asset is facilitated by marking the associated asset row for each removed asset in Table 1 as State 2, indicating that the asset is not eligible for inclusion within any pool. Other updates optionally also may be made, reflecting more specifically an interest given to a specific client. The functions of the pool creation module 811, the asset search module 812, the execution module 815, the termination module 816, the pool maintenance module 817, the network interface 818 and the database interface 819, can be implemented using software instructions encoded on a computer readable medium such as a magnetic medium (e.g., disc or tape), an optical medium (e.g., CD-R or other type of optical disc), a semiconductor memory, or any other tangible medium capable of storing or transmitting software instructions.

In addition to the automated processes offered by the server 810, in one embodiment, one or more pool managers are assigned to oversee all operations related to the asset pool. This management process includes such analysis as, for example, determining assets suitable for inclusion in the pool and verifying the legitimacy of requests for execution of the privilege under the terms and conditions of the floating privilege agreement between the portfolio owning party and a client. System 800 and the various GUI interfaces discussed supra may optionally be expanded to facilitate the needs of human pool managers pertaining to extraction of appropriate information relevant to a particular task, as well as incorporating learned information and decision points into database 801.

The system 800 depicted in FIG. 8 further includes the pool maintenance module 817 for automatically removing an asset from the pool if the dynamic factor of that asset changes from the first state to the second state. In other words, if an asset becomes ineligible for the privilege, that asset is automatically removed from the affected pool or pools. The pool maintenance module 817 then backfills the pool or pools as discussed supra. In one type of floating privilege agreement, backfilling is performed such that a constant number of assets in the pool is maintained. In another type of floating privilege agreement, a minimum quantity of assets is maintained, as controlled by the floating privilege agreement. The minimum quantity could be an absolute value or a value derived from a formula, such as a percentage of the original pool size at the time of the floating privilege agreement, or any other agreed upon method for determining the minimum size of the pool to be maintained by the owning party.

The asset search module 812, in one embodiment, may be adapted to automatically generate assets for which an interest is to be given to a client under the terms and conditions of the governing floating privilege and in view of a particular trigger event. In this embodiment, asset search module within the server 810 includes the set-size module 813 for selecting a total number of assets to which the client is entitled to request an interest in accordance with the governing floating privilege agreement. The asset search module 812 also includes the set-criterion module 814 for selecting at least one criterion for use in selecting assets up to the limit as governed by set-size module 813. In this way, upon an occurrence of a trigger event, the privilege execution may be automated for a set of assets that includes a predetermined number of assets, each asset in the set possessing the desired criterion or criteria.

One embodiment of the present invention is directed to a new system and method for assigning and licensing patents. The novel processes comprising the present invention will have greater appeal to prospective clients in the business world, as well as the potential to extract a greater return on investment from a large patent portfolio. This new paradigm encompasses the creation of one or more pools of patents to which a floating privilege is offered in return for an annuity revenue stream to the patent pool owner, or other agreed upon consideration. In accordance with the terms of a contract that runs with the floating privilege, upon the occurrence of a trigger event, the privilege is activated. The rights associated with this floating privilege include the selection of a predetermined number of patents in which the client is to receive an interest. The number of patents and the type of interest to be governed by the floating privilege.

Operation of a Floating Privilege System

Before describing the details about how assets, such as patents, are transferred, it is helpful to understand why an enterprise would perceive tremendous value in a floating privilege, as briefly described above. The answer lies in freedom of action for a business. The cost of building a substantial defensive patent portfolio is prohibitive for most small and midsized companies, typically requiring an investment of hundreds of millions of dollars. Whether building a portfolio through in-house invention, or through direct or indirect acquisition, the cost of achieving critical mass for a defensive patent portfolio can be prohibitive for all but the largest companies. But what if the protection of a large defensive patent portfolio was accessible in a time of need for a relatively modest cost? Just like purchasing a fire insurance policy for a company's capital equipment—acquiring a floating privilege that provides freedom of action protection may be perceived as a prudent business decision.

Patents in the floating privilege patent pool can continue to be available for a patent pool owner's use should the owning company have defensive needs that arise in the future. For example, a company with a large patent portfolio may create a pool for use with a floating privilege comprising thousands of patents. Over time, many clients, perhaps thousands, may have obtained floating privilege agreements for use with the pool. However, since interests in the assets are not obtained by clients until the privilege is enabled by the occurrence of a trigger event, this large pool continues to be available to the pool owner. In this way, the owner continues to derive the benefit of a large defensive portfolio, while receiving additional client revenue from offering floating privileges to the same pool. In a steady state condition, this novel instrument may actually result in reduced litigation and greater efficiency for the software industry as a whole. This, quite simply, is because a third party will be less likely to initiate litigation against a client with the vast defensive capabilities afforded by their floating privilege. While the annuity stream for any given floating privilege may be relatively modest, the aggregation of thousands of annuity streams accruing to the benefit of floating patent pool owner may be substantial.

A large pool of patents for defensive use may attract the interest of tens of thousands of small and midsized businesses. All can have a floating privilege to such a pool without risk of the pool significantly weakening overtime due to assignments coming out of the pool as trigger events occur. This is because of the significant deterrent value, as discussed supra, associated with a floating privilege to a large defensive pool of patents. A third party considering litigation in many instances may choose not to litigate once they realize that the target company has at their disposal five or ten thousand patents, for example, from which to pick and choose as fuel for a countersuit. Thus, the floating privilege affords great value even in the absence of a trigger event.

It is anticipated that patents of strong strategic interest to a company with a large asset portfolio would not be made available to others in patent pool(s) eligible for the floating privilege. Furthermore, it is anticipated that from time to time patents may be removed from the pool for use by the owning company. For example, this usage includes defensive purposes, as well as use for licensing negotiations where infringement by a third party of one or more patents in the floating privilege pool is detected by the owning company. Furthermore, a patent may be removed for any other reason, including the changing of the patent's status from non-strategic to strategic status.

A floating privilege acquired by a client is not open ended, but typically expires on a predetermined date or termination event, or a combination thereof. In one embodiment, the occurrence of a predetermined date is a termination event. Typically, a floating privilege may be renewed an unlimited number of times to provide continuing client service for an extended duration, in accordance with mutually agreed upon terms between the client and patent pool owner.

The trigger event that initiates the floating privilege is defined within the floating privilege agreement. In one embodiment, this trigger event takes the form of a litigation action initiated against the client by a third party. This litigation action likely will be the third party either sending a warning notification to the client that the client infringes a patent of the third party, or the third party filing a complaint of patent infringement against the client. A litigation action qualifying as a trigger event, however, is not limited to these situations, and can include other litigation actions such as the client expressing the desire to provoke an interference against a third party by obtaining title to one or more patents in the pool.

Upon the occurrence of the trigger event, the client executes the floating privilege for one or more of the patents in the pool or pools associated with the floating privilege (e.g. set 905 in FIG. 9, consisting of patents P1, P3 and P9). Exercising the floating privilege, enabled by the trigger event, transfers an interest in one or more pool assets to the client. The number of assets chosen by the client in which to receive an interest (i.e. assets selected on the basis of having potential to assist in addressing the issue or issues surrounding the trigger event) may not, in one embodiment, exceed the predetermined asset limit specified in the floating privilege.

In one embodiment, the client uses system 800 to search for assets with particular criteria as an aide in discerning the one or more assets in which to receive an interest. In another embodiment, the client may utilize services provided by the pool owner or other parties to assist with the selection process. In another embodiment, the floating privilege does not specify an upper limit on the number of assets that may be transferred but only specifies that a specific need arising out of the trigger event must be satisfied for each asset in which an interest is to be received. For example, contractual language could limit the choice of patents to those deemed to have a defensive purpose for the litigation at hand. That is, in the absence of a useful patent available in the pool for a specific litigation need, the client may not take advantage of the opportunity to acquire arbitrary intellectual property not relevant to the ongoing litigation.

The floating privilege agreement may include selecting multiple sets, each comprising one or more assets from one or multiple pools, such that each set is tailored to a different trigger event. The number of patents that may be assigned for a given trigger event, in one embodiment, is set to a predetermined limit and specified in the floating privilege agreement. In one embodiment, the predetermined limit is set to one. In another embodiment, the predetermined limit is set to two. In another embodiment, the predetermined limit is set to more than two patents. In another embodiment, the predetermined limit is variable depending upon specific circumstances surrounding the trigger event. In still another embodiment, there is no specific predetermined limit, but rather the number of assets in which an interest is to be received is governed by meeting a standard of appropriate usefulness of the asset to serve a particular purpose as identified within the floating privilege.

A floating privilege may be terminated in any of numerous ways, as specified within the floating privilege agreement. Exemplary termination conditions include, but are not limited to, failure to make previously agreed to payments, the conclusion of a trigger event, the passing of a particular date or period of time, failure to renew a renewable floating privilege agreement, sale or other demise of the client entity, etc. These, and other conditions agreed to by the client and pool owner for termination, or any combination thereof, are hereinafter referred to as a termination event. Upon the occurrence of a termination event, in one embodiment, interests in assets acquired under the floating privilege are returned to the pool owner. In another embodiment, interests in assets acquired under the floating privilege survive the termination of the floating privilege and remain in the possession of the client. In still another embodiment, disposition of the interest in assets is controlled by other conditions not relating to a termination event. It is to be understood that a "predefined event" or, alternatively and equivalent in its intended meaning, a "predetermined event" within the context of this application does not typically mean previously identifying an actual event that is pre-arranged to occur at a future time, but rather predefining or predetermining a type of event, such as a litigation event. Therefore, the "predetermining" or "predefining" is typically identifying a type, feature, class, characteristic, etc. such that a future actual event may fall into a specified "predetermined" or "predefined" event category by virtue of its type, feature, class, characteristic, etc.

Multiple Dynamic Asset Pools

A company with a very large number of patents eligible for a floating privilege exposure may wish to consider dividing the patents into two or more pools. In one embodiment, a single patent may appear in more than one patent pool. For example, multiple pools of patents eligible for a floating privilege may each target one or more predetermined technology areas or, alternatively, the company may choose another selection criterion for placing a patent into one or more patent pools. In this environment, a floating privilege could be directed to any one or combination of existing patent pools of common ownership. In one embodiment, different pricing structures are established for each of the various pools depending upon size of the pool and other characteristics deterministic of value.

In one embodiment, the resources of multiple portfolio owning enterprises are combined into one or more pools for the purpose of establishing floating privilege agreements. In this way, even more value may be presented for the client's consideration with a greater number of assets in the one or more pools than would be otherwise possible from just a single enterprise. In this embodiment, client revenues are shared between the owning enterprises in an agreed upon manner, and all pool transactions, as discussed supra, may require the approval of all owning enterprises. In one embodiment, one of the enterprises, or a third party, is designated to manage the one or more pools of combined assets.

Indexing Assets within a Dynamic Asset Pool

Patents (or other forms of intellectual property assets) can be indexed within the database 801 according to a variety of aspects, as depicted in Table 2, below. Each row in Table 2 corresponds to a patent from a portfolio of assets. Each patent is assigned an asset identifier, e.g. "P1," "P2," etc. The state of at least one dynamic factor is stored for each patent. Exemplary fields include the status of the patent and expiration date, the level of value to the portfolio owner, and whether or not each asset has been incorporated into one or more pools, such as the first pool 901, or the second pool 903, or both the first and second pools 901 and 903, from FIG. 9. In the example of Table 2, some patents (e.g. P1 in FIG. 9) are in the first pool 901 but not in the second pool 903, while others (e.g. P8 in FIG. 9) are in the second pool 903 but not in the first pool 901. Further, some patents, (e.g. P7 in FIG. 9) are in both the first and second pools. Still other patents (e.g. P2, P4, P5, P6) from the portfolio 900 are not presently eligible for either pool. However, should a dynamic factor of an asset change, e.g. if the level of value to the owner for patent P5 changes from high to low, the portfolio owner may choose to incorporate patent P5 into one or more pools.

Each patent is described by at least one selection criteria, e.g. the representative arts the patent is concerned with. In Table 2, the class(es) represented by each patent is identified. In one embodiment, clients can search the database for patents in a pool of eligible assets from desired classes. In other embodiments, the database could store the entire abstract or a list of keywords pertaining to the patent, or other forms of searchable selection criteria. The database 801 could store an indication of whether or not a given patent meets the selection criteria desired by the client or clients. The database 801, in one embodiment, also stores an indicator for whether or not a privilege has been granted for each asset, as in Table 2, and the client receiving the privilege.

the owner of a patent pool can retain a nonexclusive license to the patent assigned to a client through the floating privilege agreement.

Other conditions and rules associated with a floating privilege may be agreed upon between the pool owner and the client. The company granting the privilege may retain the right to prevent the client from executing the privilege to obtain an interest in a patent if, for example, the transfer of rights to the patent would harm the granting company due to the circumstances surrounding the intended use. Other conditions can be agreed upon by the pool owner and the client. For example, a company may wish to restrict usage of an assigned patent, such as restricting the right to further sell the assigned patent to a third party, or further restricting the right to use the patent offensively against another client with an active floating privilege. A patent pool owner may extend a nonexclusive license to all patents in the patent pool for which the client has obtained a floating privilege, thereby further reinforcing the client's freedom of action position. All of these additional details, and others reasonably inferred by the teachings herein are anticipated by this invention.

Use of Qualified Assets

A client company with a "floating privilege" to a large patent portfolio has access to an impressive defensive arsenal that serves as a deterrent against unwanted litigation. The patent pool owner may choose to strengthen the deterrent value of the floating privilege by recording, in a publicly viewable repository, the company names of those clients in possession of floating privileges to one or more patent pools. Of course, the client may also choose to make their floating privilege known to the public through any of a variety of means, at their discretion.

An asset pool owner may optionally make available for additional fees various services relevant to a floating privilege. These services, for example, may include patent selection assistance, due diligence studies or the creation of proof packs for proving infringement of a patent. An asset pool owner may also choose to advertise the availability of floating

TABLE 2

| Asset Identifier | Status | Level of Value to Owner | First Pool | Second Pool | Representative arts | Privilege Granted? | Client receiving privilege |
|---|---|---|---|---|---|---|---|
| Patent 1 (P1) | Issued | Low | Yes | no | Class 1, class 2 | Yes | Client A |
| P2 | Expired | Low | No | No | Class 3 | No | n/a |
| P3 | Issued | Low | Yes | Yes | Class 2, class 3 | Yes | n/a |
| P4 | Abandoned | n/a | No | No | n/a | No | n/a |
| P5 | Issued | High | No | No | Class 1, class 2 | No | n/a |
| P6 | Issued | High | No | No | Class 1, class 3 | No | n/a |
| P7 | Issued | low | Yes | yes | Class 2 | No | Client A |
| P8 | Issued | low | No | yes | Class 3 | No | n/a |
| P9 | Issued | low | Yes | no | Class 1, class 2 | Yes | Client A |
| P10 | Issued | low | No | yes | Class 3 | No | n/a |

Interests in Pool Assets

It is possible to consider many variations in the type of assignment to be made under a floating privilege agreement. In one embodiment, the assignment is a simple assignment that transfers the entire right, title and interest in a patent to the client, with no conditions on the assignment. In other embodiments various conditions can be imposed on the third party with the assignment. For example, the patent owner can reserve a right of reversion that runs with the assignment whereupon the patent is assigned back to the original patent owner upon concluding the litigation matter that triggered the exercise of the floating privilege. In still another embodiment, privilege opportunities, or enlist the services of a broker in expanding the growth of clients utilizing the floating privilege service. This is not unlike an insurance broker offering various insurance policies underwritten by one or more insurers.

When the floating privilege is granted from a patent portfolio owner to a client for a set of qualified patents, in accordance with embodiments of the present invention, rights in the qualified patents are transferred from the patent portfolio owner to the client. In one embodiment, this transfer of rights is accomplished by an assignment of the rights. In another embodiment, the transfer of rights is accomplished by licensing the rights. When a floating privilege is terminated responsive to a terminating event, any rights transferred during the life of the floating privilege agreement are subject to possible reversion back to the granting party. However, in one embodiment, any rights that accrued during the life of the floating agreement are retained by the receiving party, unaffected by the termination of the floating privilege agreement.

One example of a dynamic factor exhibited by the patents in the portfolio is the status of the patent. In reference to Table 2, supra, the patent status may be "issued", "expired" or abandoned. Patents that are "issued" are eligible for further consideration with respect to pool creation, whereas a patent status of "expired" or "abandoned" would preclude further consideration for use in a pool. An expiration or abandonment of a patent is considered to be a "pool event" wherein the expiring or abandoned asset must be removed from the one or more pools in which the asset presently resides. In one embodiment, a pool event involves evaluating whether backfilling into the one or more pools from which the asset was removed must occur in accordance with minimum pool size requirements specified within the floating privilege agreement. If backfilling is required, Table 2, supra, may be utilized in finding other suitable assets in the portfolio eligible for placement into a pool by querying relevant dynamic factors. In one embodiment, a dynamic factor representing value to the portfolio owner is used in discerning eligibility for inclusion within a pool. Patents having a low level of value to the portfolio owner are eligible for inclusion in a pool, while patents having a high level of value to the portfolio owner are not eligible for the privilege. As can be appreciated by one of ordinary skill in the art of patent portfolio management, patents possess other dynamic factors that may be utilized in performing the various processes encompassed by this invention.

The server described above could carry out actual patent assignment processing with subsequent removal from the pool, as well as backfilling by adding additional patents to the pool to replace patents that were removed by assignment, expiration or strategy-related status change. Beyond the automated processes, the pool management process, described above, includes such analysis as, for example, determining patents suitable for inclusion in the pool and verifying the legitimacy of requests for assignment under the terms and conditions of a floating privilege.

In one embodiment of the present invention, the pool is dynamic in that patents can be removed from the pool by the pool maintenance module for any of numerous reasons. Exemplary reasons include transferring an interest in an asset to a client under the terms of a floating privilege agreement. That is, the interest transferred to the client typically precludes the use of the asset by other clients having a floating privilege to the pool and therefore the asset is removed from the pool as a means of enforcing its unavailability. Furthermore, assets within a pool may expire or become abandoned. Further still, assets may become ineligible for the floating privilege due to the higher priority needs of the portfolio owner. As assets are removed from a pool, backfilling with other eligible assets from a portfolio may occur in maintaining minimum pool size requirements in accordance with a governing floating privilege agreement.

In one embodiment, the execution of the floating privilege includes assigning qualified patents in the pool from a portfolio owner to a client upon the occurrence of a trigger event. The process by which patents become qualified is governed by the applicable floating privilege agreement. Upon the occurrence of a termination event, as defined by the applicable floating privilege agreement, all rights and privileges under the floating agreement are revoked. The applicable floating privilege agreement may further specify other terms and conditions to be met in addition to the discontinuance of the rights and privileges established by the agreement. For example, the applicable floating privilege agreement may further address processes pertaining to the final disposition of assets accrued during the life of the floating agreement. In one embodiment, a terminated floating privilege may be renewed under the currently prevailing terms and conditions or as further negotiated between the parties.

It will be understood that many variations and alternative embodiments are encompassed by the present invention. For example, the following features can be present in one or more embodiments.

A floating privilege agreement might specify that a client must provide some type of consideration, such as paying certain fees, either to exercise the privilege or to acquire an asset upon exercising the privilege, or both. The fee can be a one time fee on an on-going fee. Also, consideration other than monetary fees can be required of the client to exercise the privilege or acquire an interest in the asset.

A client might obtain a floating privilege primarily because of particular assets in a portfolio owner's pool of assets. In this case, the client wants assurances that the particular assets of interest are always present whenever the client might want to exercise the privilege. Accordingly, in certain embodiments assets can be "frozen" in the dynamic pool of assets such that the portfolio owner guarantees the client that such assets will be available to the client from the pool whenever the client exercises the privilege. In this regard, information concerning the asset includes an indicator of whether the asset is in a frozen or unfrozen state. The client may be required to pay a premium for a privilege to acquire such frozen assets. In one embodiment the portfolio owner may not remove a frozen asset from a pool. To support such a requirement the systems responsible for maintaining the portfolio owner's dynamic pools of assets determine when an asset pool event occurs, such as adding or removing an assert from the pool. Upon determining that an asset pool event has occurred, such as the portfolio owner attempting to remove an asset from the pool for the portfolio owner's benefit, the asset to be removed is evaluated to determine whether it is in the frozen state. This can be accomplished by inspecting the indicator within the information about the asset that indicates whether the asset is in a frozen or unfrozen state. If the asset is determined to be in a frozen state the asset is prevented from being removed from the dynamic pool of assets. If the indicator indicates that the asset is in an unfrozen state the asset is removed from the dynamic pool of assets. If the asset is removed, another asset within the portfolio can be added to the dynamic pool of assets to meet any minimum requirements for the pool.

In another embodiment, a floating privilege agreement can specify that a dynamic pool of assets will contain various types of assets. Certain minimum requirements for these various types of assets can be specified in the floating privilege agreement. Accordingly, when backfilling assets to replace removed assets, these minimum requirements for various types of assets are taken into account when selecting assets for backfilling into a dynamic pool of assets.

In summary, a floating privilege is a highly valuable asset, providing ample business justification for a client company to purchase this protection. In addition, the highly recognizable value of a floating privilege may incent an alleged infringer of a patent(s) to promptly enter into a licensing agreement with the patent pool owner with the floating privilege offer used as added incentive for reaching an amicable agreement pertaining to the infringement. Thus, the floating privilege instrument may be used in a variety of ways to enhance the revenue and profits generated from a large patent portfolio.

Having described methods, apparatuses and articles of manufacture for extracting value from a large portfolio of assets, it is believed that other modifications, variations and changes will be suggested to those skilled in the art in view of the teachings set forth herein. It is therefore to be understood that all such variations, modifications and changes are believed to fall within the scope of the present invention. Although specific terms are employed herein, they are used in their ordinary and accustomed manner only, unless expressly defined differently herein, and not for purposes of limitation.

What we claim is:

1. A computer program product comprising a permanent and durable computer useable medium having a computer readable program, wherein the computer readable program when executed on a computer causes the computer to execute a method for extracting value from a portfolio of assets, the method comprising:
granting a privilege to a second party by a first party at time t1, wherein exercise of the privilege is conditioned upon an occurrence of a predetermined event occurring at time t2 where t2>t1, wherein the privilege comprises a right to obtain an interest in one or more assets residing in a dynamic pool of assets comprised of assets from the portfolio of assets at time t2, wherein the assets residing in the dynamic pool of assets at time t2 may be different from the assets residing in the dynamic pool of assets at time t1, and wherein a computer stores information concerning the dynamic pool of assets in a computer readable memory,
wherein the exercise of the privilege further comprises obtaining the interest in the one or more assets residing in the dynamic pool of assets comprised of assets from the portfolio of assets at time t2, the one or more assets being less than a size of the dynamic pool.

2. The computer-program product of claim 1, wherein the privilege is defined in a floating privilege agreement between the first and second parties, the floating privilege agreement having a term and specifying the predetermined event and the type of interest to be conveyed to the second party upon execution of the privilege.

3. The computer-program product of claim 2, wherein a number of assets in which the second party receives an interest is limited based on the floating privilege agreement.

4. The computer-program product of claim 2, wherein the assets are intellectual property assets.

5. The computer-program product of claim 4, wherein the intellectual property assets are patents.

6. The computer-program product of claim 4, wherein the intellectual property assets are copyrights.

7. The computer-program product of claim 4, wherein the intellectual property assets are trade secrets.

8. The computer-program product of claim 4, wherein the privilege is exercised by the first party transferring rights in one or more of the assets in the dynamic pool of assets to the second party.

9. The computer-program product of claim 8, wherein the transfer is by assignment.

10. The computer-program product of claim 8, wherein the transfer is by license.

11. The computer-program product of claim 10, wherein the license is an exclusive license.

12. The computer-program product of claim 4, wherein an occurrence of the predetermined event is a trigger event defined in the floating privilege agreement.

13. The computer-program product of claim 12, wherein the trigger event is a litigation-related event.

14. The computer-program product of claim 12, wherein the litigation-related event is a filing of a complaint against the second party.

15. The computer-program product of claim 14, wherein the complaint against the second party alleges that the second party infringes an intellectual property asset of a third party.

16. The computer-program product of claim 12, wherein exercising the privilege comprises the second party selecting an asset from the dynamic pool of assets in response to occurrence of the trigger event.

17. The computer-program product of claim 16, wherein exercising the privilege further comprises the first party qualifying the selected asset for transfer to the second party to ensure the selected asset is appropriate for use by the second party for the trigger event, and if the first party qualifies the selected asset for transfer the first party transfers rights in the selected asset to the second party.

18. The computer-program product of claim 12, wherein rights to an asset transferred under a floating privilege agreement in the dynamic pool of assets revert to the first party after conclusion of the trigger event.

19. The computer-program product of claim 4, further comprising removing an asset from the dynamic pool of assets during the term of the floating privilege agreement for use by the first party.

20. The computer-program product of claim 4, further comprising removing an asset from the dynamic pool of assets during the term of the floating privilege agreement in response to expiration of the first party's rights in the asset.

21. The computer-program product of claim 4, further comprising removing an asset from the dynamic pool of assets during the term of the floating privilege agreement in response to transfer of the asset to a third party.

22. The computer-program product of claim 4, further comprising removing an asset from the dynamic pool of assets during the term of the floating privilege agreement in response to a determination that the asset is of strategic value to the first party.

23. The computer-program product of claim 4, wherein an additional asset is added to the dynamic pool of assets during the term of the floating privilege agreement.

24. The computer-program product of claim 23, wherein the additional asset is added to the dynamic pool of assets in response to removing an asset from the dynamic pool of assets wherein obligations relating to the size of the dynamic pool of assets are fulfilled.

25. The computer-program product of claim 2, wherein the assets include intellectual property assets selected from the group consisting of patents, trademarks, copyrights and trade secrets.

26. The computer-program product of claim 2 further comprising creating the dynamic pool of assets from a portfolio of assets of the first party by selecting a candidate asset from the portfolio of assets, evaluating a value of the candidate asset, determining if the candidate asset is suitable for inclusion in the dynamic pool of assets based on a value of the candidate asset, and adding the candidate asset to the dynamic pool of assets if the candidate asset is deemed suitable.

27. The computer-program product of claim 26 further comprising, determining if the dynamic pool of assets has a minimum number of assets and continuing to add assets if the dynamic pool of assets does not have the minimum number of assets.

28. The computer-program product of claim 2, further comprising generating the floating privilege agreement by associating a dynamic pool of assets with the privilege.

29. The computer-program product of claim 28, further comprising specifying in the floating privilege agreement a minimum number of assets.

30. The computer-program product of claim 29, further comprising specifying in the floating privilege agreement an attribute of a trigger event, wherein the trigger event is an event that qualifies the second party to execute the privilege.

31. The computer-program product of claim 2, wherein the privilege is terminated in response to occurrence of a termination event specified in the floating privilege agreement.

32. The computer-program product of claim 31, wherein the termination event is expiration of the floating privilege.

33. The computer-program product of claim 31, wherein the termination event is a use of the privilege.

34. The computer-program product of claim 31, wherein the termination event is transfer of a right to the privilege to a third party.

35. The computer-program product of claim 2, wherein assets transferred under a floating privilege agreement are retained by the first party after expiration of the privilege.

36. The computer-program product of claim 2, wherein rights to an asset transferred under a floating privilege agreement in the dynamic pool of assets revert to the first party after the floating privilege expires.

37. The computer-program product of claim 2, wherein the privilege defined in the floating privilege agreement is a privilege for acquiring an interest in assets in a plurality of dynamic pools of assets.

38. The computer-program product of claim 2, wherein the privilege defined in the floating privilege agreement is a privilege for acquiring an interest in assets in only a single dynamic pool of assets.

39. The computer-program product of claim 2, wherein the dynamic pool of assets includes assets owned by a plurality of owners.

40. The computer-program product of claim 39, wherein the dynamic pool of assets is managed by one or more of the owners of assets in the dynamic pool of assets.

41. The computer-program product of claim 2, wherein the privilege defined in the floating privilege agreement is a privilege to acquire an interest in assets contained in a plurality of dynamic pool of assets having assets owned by a plurality of owners.

42. The computer program product of claim 2, wherein the floating point agreement includes a term limiting the second party from enforcing the rights in said one or more assets against a third party who has been granted a privilege by the first party to the dynamic pool of assets.

43. The computer-program product of claim 1 further comprising providing a service for finding useful assets in the dynamic pool of assets.

44. The computer-program product of claim 1 further comprising providing a service for building proof packs for qualified assets.

45. The computer-program product of claim 1 further comprising providing a service for marketing or selling or brokering a floating privilege agreement.

46. The computer program product of claim 1, wherein there are no assets in the dynamic pool of assets at time t1.

47. The computer program product of claim 1, wherein one or more of the assets in the dynamic pool of assets at time t1 are in the dynamic pool of assets at time t2.

48. The computer program product of claim 1, wherein the interest obtained by the second party includes the right for the second party to enforce rights in said one or more assets against a third party.

49. The computer program product of claim 48, wherein the interest obtained by the second party includes the right to sue for patent infringement.

50. The computer program product of claim 1, wherein the exercise of the privilege comprises selecting one or more assets residing in a dynamic pool of assets comprised of assets from the portfolio of assets at time t2 and obtaining an interest in the selected one or more assets.

51. The computer program product of claim 1, wherein exercising the privilege further comprises the first party qualifying the selected asset for transfer to the second party to ensure the selected asset is appropriate for use by the second party for the trigger event, and if the first party qualifies the selected asset for transfer the first party transfers rights in the selected asset to the second party.

52. A system for maintaining a dynamic pool of assets controlled by a first party and accessible by a second party having a privilege that includes a right to acquire an interest in at least one asset in the pool of assets, comprising:
a database of information describing the dynamic pool of assets;
a server coupled to a network for accessing the database, the server comprising:
an asset search module accessible by the second party for selecting a set of assets from the dynamic pool of assets;
an execution module for facilitating execution of the privilege, the exercise of the privilege conditioned upon an occurrence of a predetermined event such that the second party obtains the interest in at least one of the assets in the selected set of assets, and recording in the database an indicator that the second party has obtained the interest in said at least one of the assets,
wherein the exercise of the privilege further comprises obtaining the interest in the at least one of the assets in the selected set of assets, the at least one of the assets being less than a size of the dynamic pool of assets.

53. The system of claim 52, wherein the assets in the dynamic pool of assets are intellectual property assets comprising one or more of patents, trademarks, copyrights and trade secrets, wherein the privilege is governed by a floating privilege agreement, and wherein when the privilege is executed rights in the at least one asset in the selected set of assets are transferred from the first party to the second party.

54. The system of claim 53, wherein the rights in the intellectual property assets are transferred by assignment of the rights.

55. The system of claim 53, wherein the rights in the intellectual property assets are transferred by licensing the rights.

56. The system of claim 53, wherein the privilege is defined in the floating privilege agreement between the first and second parties, the floating privilege agreement having a term and specifying a trigger event the occurrence of which is a condition for executing the privilege, and specifying the type of interest to be conveyed to the second party upon execution of the privilege.

57. The system of claim 56, wherein an occurrence of the predetermined event is a trigger event defined in the floating privilege agreement.

58. The system of claim 57, wherein the trigger event is a litigation-related event.

59. The system of claim 58, wherein the litigation-related event is a filing of a complaint against the second party.

60. The system of claim 59, wherein the complaint against the second party alleges that the second party infringes an intellectual property asset of a third party.

61. The system of claim 60, wherein the asset search module operates to allow the second party to exercise the privilege by selecting an asset from the dynamic pool of assets in response to occurrence of the trigger event.

62. The system of claim 61, wherein the execution module operates to allow the first party to qualify the selected asset for transfer to the second party to ensure the selected asset is appropriate for use by the second party for the trigger event, and if the first party qualifies the selected asset for transfer the first party transfers rights in the selected asset to the second party.

63. The system of claim 61, wherein the asset search module comprises:
a set-size module for selecting a total number of assets for the set up to a limit specified in the floating privilege agreement; and
a set-criterion module for selecting a criterion for use in automatically selecting assets in the set up to said total number of assets for the set upon the occurrence of the trigger event.

64. The system of claim 53, wherein assets within a portfolio of assets are each characterized by a dynamic factor having a first state and a second state, wherein assets in the first state are eligible for the privilege and assets in the second state are not eligible for the privilege, wherein the server further comprises a pool creation module accessed by the first party for creating the dynamic pool of assets by selecting assets in the first state from the portfolio, wherein the assets in the dynamic pool are eligible for the privilege at the time of the selection of the dynamic pool of assets, and wherein said set of selected assets is selected from the dynamic pool of assets.

65. The system of claim 64, wherein the pool creation module selects an asset among a portfolio of assets for inclusion in the dynamic pool of assets based on one or more of the following factors associated with the assets:
an expiration factor, wherein an asset in the first state of the expiration factor is unexpired and eligible for the privilege and an asset in the second state of the expiration factor is expired and not eligible for the privilege; and
a value factor, wherein an asset in the first state of the value factor possesses a low level of value to the first party and is eligible for the privilege and an asset in the second state of the value factor possesses a high level of value to the first party and is not eligible for the privilege.

66. The system of claim 65, wherein the pool creation module selects an asset for inclusion in the dynamic pool of assets based further on a second value factor, wherein an asset in the first state of the second value factor possesses a high level of value to the second party and is eligible for the privilege and an asset in the second state of the second value factor possesses a low level of value to the second party and is not eligible for the floating privilege.

67. The system of claim 64, further comprising a pool maintenance module for automatically removing a first asset from the pool if the dynamic factor of the first asset changes from the first state to the second state.

68. The system of claim 67, wherein the pool maintenance module in response to removing the first asset from the pool, automatically backfills the pool by adding a second asset to the pool from the portfolio if the dynamic factor of the second asset is in the first state.

69. The system of claim 68, wherein the pool maintenance module automatically backfills the pool such that a predefined minimum number of assets in the pool is maintained.

70. The system of claim 53, further comprising a termination module coupled with the server for terminating the privilege upon an occurrence of a predetermined privilege-ending event.

71. The system of claim 70, wherein the predetermined privilege-ending event is a second litigation related event.

72. The system of claim 70, wherein when the privilege is terminated, the rights in the at least one of the assets in the selected set of assets revert to the first party.

73. The system of claim 52, wherein the execution module is for facilitating execution of the privilege upon an occurrence of a predetermined event such that the second party selects at least one of the assets in the selected set of assets and obtains the interest in the selected assert, and recording in the database an indicator that the second party has obtained the interest in said at least one of the assets.

74. A computer program product for maintaining a dynamic pool of assets owned by a first party among a portfolio of assets, comprising a permanent and durable computer useable medium having a computer readable program, wherein the computer readable program when executed on a computer causes the computer to:
determine if a floating privilege event has occurred;
determine if the floating privilege event is a qualified trigger event;
facilitate a second party selecting an asset from the dynamic pool of assets if the first party has granted the second party a privilege comprising a right to select an asset from the dynamic pool of assets in response to a qualified trigger event, wherein exercise of the privilege is conditioned upon an occurrence of the qualified trigger event;
verify that the selected asset is qualified for execution of the privilege;
grant the second party an interest in the selected asset if the selected asset is verified to be qualified for execution of the privilege; and
remove the selected asset from the dynamic pool of assets if the second party is granted an interest in the selected asset,
wherein the selected asset is less than a size of the dynamic pool of assets.

75. The computer program product of claim 74, wherein the assets in the dynamic pool of assets include intellectual property assets including one or more of patents, trademarks, copyrights and trade secrets.

76. The computer program product of claim 75, wherein the privilege is exercised by the first party transferring rights in one or more of the assets in the dynamic pool of assets to the second party.

77. The computer program product of claim 76, wherein the transfer is by assignment.

78. The computer program product of claim 76, wherein the transfer is by license.

79. The computer program product of claim 78, wherein the license is an exclusive license.

80. The computer program product of claim 75, wherein assets within the portfolio of assets are each characterized by a dynamic factor having a first state and a second state, wherein assets in the first state are eligible for the privilege and assets in the second state are not eligible for the privilege, wherein the computer readable program when executed on a computer further causes the computer to create the dynamic pool of assets by selecting assets in the first state from the portfolio of assets.

81. The computer program product of claim 80, wherein in response to removing a first asset from the dynamic pool of assets the computer readable program when executed on a computer further causes the computer to automatically backfill the dynamic pool of assets by adding a second asset to the pool from the portfolio of assets if the dynamic factor of the second asset is in the first state.

82. The computer program product of claim 75, wherein the trigger event is a litigation-related event.

83. The computer program product of claim 82, wherein the litigation-related event is a filing of a complaint against the second party.

84. The computer program product of claim 83, wherein the complaint against the second party alleges that the second party infringes an intellectual property asset of a third party.

85. A computer program product comprising a permanent and durable computer useable medium having a computer readable program, wherein the computer readable program when executed on a computer causes the computer to execute a programmed method of extracting value from a dynamic pool of assets owned by a first party among a portfolio of assets, the method comprising:
  determining if a floating privilege event has occurred;
  determining if the floating privilege event is a qualified trigger event;
  facilitating a second party selecting an asset from the dynamic pool of assets if the first party has granted the second party a privilege that comprises a right to select an asset from the dynamic pool of assets in response to a qualified trigger event, wherein exercise of the privilege is conditioned upon an occurrence of the qualified trigger event;
  verifying that the selected asset is qualified for execution of the privilege;
  granting the second party an interest in the selected asset if the selected asset is verified to be qualified for execution of the privilege;
  removing the selected asset from the dynamic pool of assets if the second party is granted an interest in the selected asset, wherein information concerning the dynamic pool of assets is stored in a computer readable memory and in response to removing the selected asset from the dynamic pool of assets, a computer updates the information in the computer readable memory concerning the dynamic pool of assets, wherein the selected asset is less than a size of the dynamic pool of assets.

86. The computer program product of claim 85, wherein the qualified trigger event is a request by the second party to exercise the privilege.

87. The computer program product of claim 85, wherein the second party incurs one or more fees upon exercising the privilege.

88. The computer program product of claim 85, wherein the privilege comprises the right of the second party to purchase the selected asset for valuable consideration.

89. The computer program product of claim 85 further comprising determining if an asset pool event has occurred.

90. The computer program product of claim 89 wherein the asset pool event is an action initiated by the first party to use a second asset for the benefit of the first party, wherein responsive to the action the second asset is evaluated for removal from the dynamic pool of assets.

91. The computer program product of claim 90 wherein the second asset is not removed from the dynamic pool of assets responsive to an indication that the second asset is in a frozen state.

92. The computer program product of claim 90 wherein the second asset is removed from the dynamic pool of assets.

93. The computer program product of claim 90 wherein a third asset in a first state is selected from the portfolio for inclusion in the dynamic pool of assets to backfill for the removal of the second asset form the dynamic pool of assets.

94. The computer program product of claim 93, wherein the backfill is responsive to achieving minimum size requirements for the dynamic pool of assets specified in a floating privilege agreement governing the privilege.

95. The computer program product of claim 93 wherein the minimum size requirement specifies a minimum size requirement for each of a plurality of types of assets.

96. A computer program product comprising a permanent and durable computer useable medium having a computer readable program, wherein the computer readable program when executed on a computer causes the computer to execute a method for extracting value from a dynamic pool of assets, the method comprising:
  granting a privilege to a second party by a first party to permit the second party, wherein exercise of the privilege is conditioned upon an occurrence of a predetermined event, and wherein the privilege comprises a right to obtain an interest in one or more assets residing in the dynamic pool of assets at the time of exercise; wherein a computer stores information concerning the dynamic pool of assets in a computer readable memory,
  wherein the exercise of the privilege further comprises obtaining the interest in the one or more assets residing in the dynamic pool of assets comprised of assets from the portfolio of assets at time t2, the one or more assets being less than a size of the dynamic pool.

97. The computer program product of claim 96, wherein the dynamic pool of assets includes a plurality of different assets.

98. The computer program product of claim 96, wherein the exercise comprises selecting one or more assets residing in the dynamic pool of assets at the time of exercise, and obtaining an interest in the selected one or more assets; wherein a computer stores information concerning the dynamic pool of assets in a computer readable memory.

99. A computer program product comprising a permanent and durable computer useable medium having a computer readable program, wherein the computer readable program when executed on a computer causes the computer to execute a method for extracting value from a dynamic pool of assets, the method comprising:
  granting to a second party by a first party a conditional right to i) obtain an interest in a patent from among a pool of patents in which the first party holds an interest and ii) enforce the patent in a counterclaim suit against a third party that alleges infringement of a third party patent in which the third party holds an interest, by the second party, wherein exercise of the conditional right is conditioned upon an occurrence of the third party alleging infringement by the second party of the third party patent;
  recording in a database an indication of the conditional right granted to the second party; and
  providing to the second party a list of patents from among patents in the pool of patents from which the patent is selected to enforce in the counterclaim suit against the third party, in response to the third party alleging infringement by the second party of the third party patent, based on the indication of the conditional right recorded in the database, wherein the providing further comprises granting the second party the interest in the patent residing in the list of patents comprised of patents from the pool of patents, the patent being less than a size of the pool of patents.

* * * * *